US007779796B2

(12) United States Patent
Nakamura

(10) Patent No.: US 7,779,796 B2
(45) Date of Patent: Aug. 24, 2010

(54) VARIABLE VALVE ACTUATING APPARATUS FOR INTERNAL COMBUSTION ENGINE AND PROCESS OF CONTROLLING THE SAME

(75) Inventor: Makoto Nakamura, Isehara (JP)

(73) Assignee: Hitachi, Ltd., Tokyo (JP)

( * ) Notice: Subject to any disclaimer, the term of this patent is extended or adjusted under 35 U.S.C. 154(b) by 373 days.

(21) Appl. No.: 12/071,527

(22) Filed: Feb. 21, 2008

(65) Prior Publication Data
US 2008/0216780 A1 Sep. 11, 2008

(30) Foreign Application Priority Data
Mar. 8, 2007 (JP) ............................... 2007-058111

(51) Int. Cl.
*F01L 1/34* (2006.01)
(52) U.S. Cl. .................. 123/90.15; 123/90.17; 123/347; 123/559.1; 60/605.1
(58) Field of Classification Search ............. 123/90.15, 123/90.16, 90.17, 90.18, 345, 346, 347, 348; 123/432, 559.1, 562, 564; 60/605.1, 611, 60/612
See application file for complete search history.

(56) References Cited

U.S. PATENT DOCUMENTS 7,308,872 B2 * 12/2007 Sellnau et al. ........... 123/90.16

FOREIGN PATENT DOCUMENTS

JP 2003-003871 A 1/2003
JP 2003-172112 A 6/2003

* cited by examiner

*Primary Examiner*—Ching Chang
(74) *Attorney, Agent, or Firm*—Foley & Lardner LLP

(57) ABSTRACT

A variable valve actuating apparatus for an internal combustion engine with an exhaust turbocharger. An intake valve characteristic varying section is arranged to vary an operating angle and a lift of an intake valve. An exhaust valve characteristic varying section is arranged to vary an opening timing and a closing timing of an exhaust valve. In response to an increase in a desired value of an output of the engine, a control section advances an opening timing of the intake valve, retards a closing timing of the intake valve, and advances the opening timing of the exhaust valve. In response to an increase in a boost pressure of the exhaust turbocharger, the control section increases the operating angle and the lift of the intake valve, and retards the opening timing and the closing timing of the exhaust valve.

21 Claims, 11 Drawing Sheets

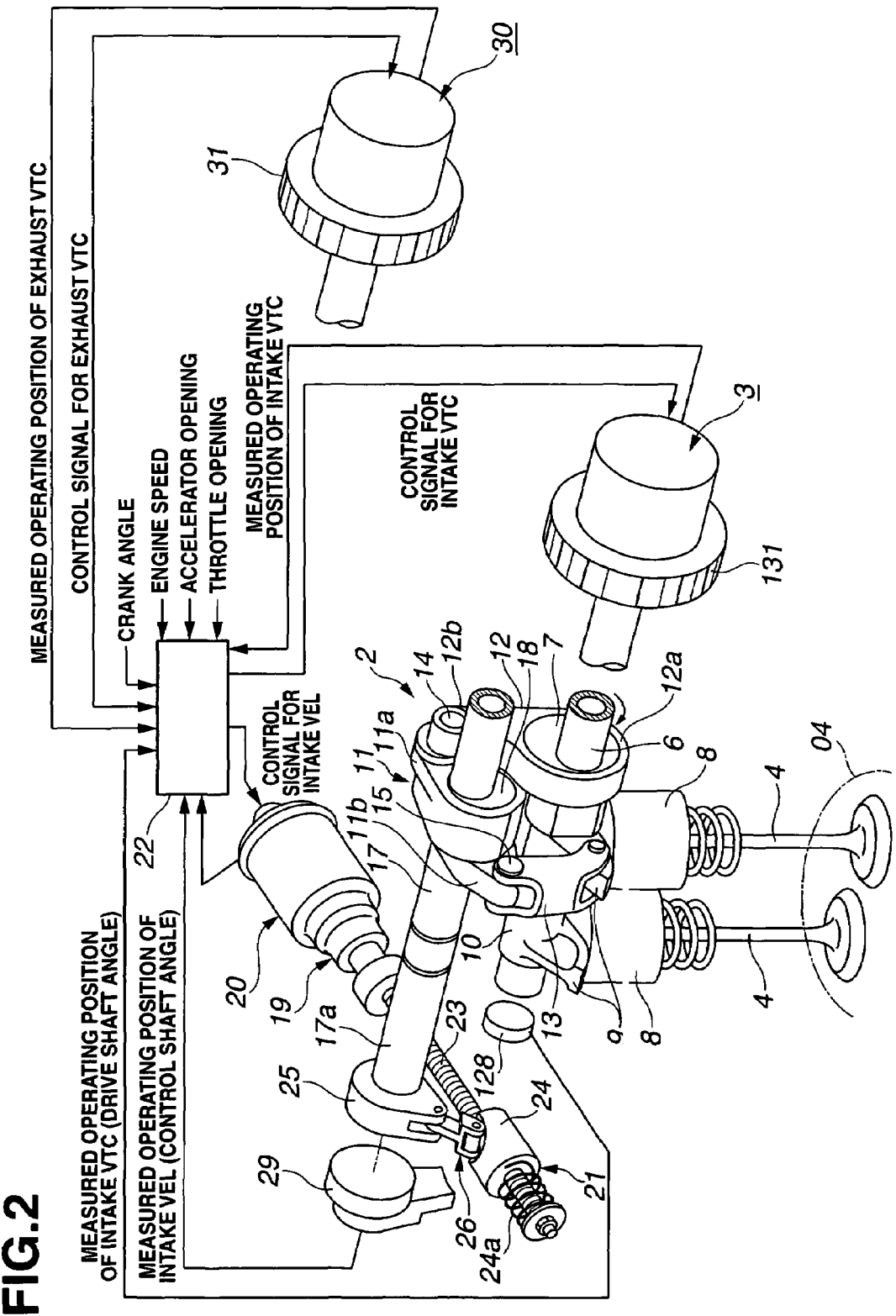

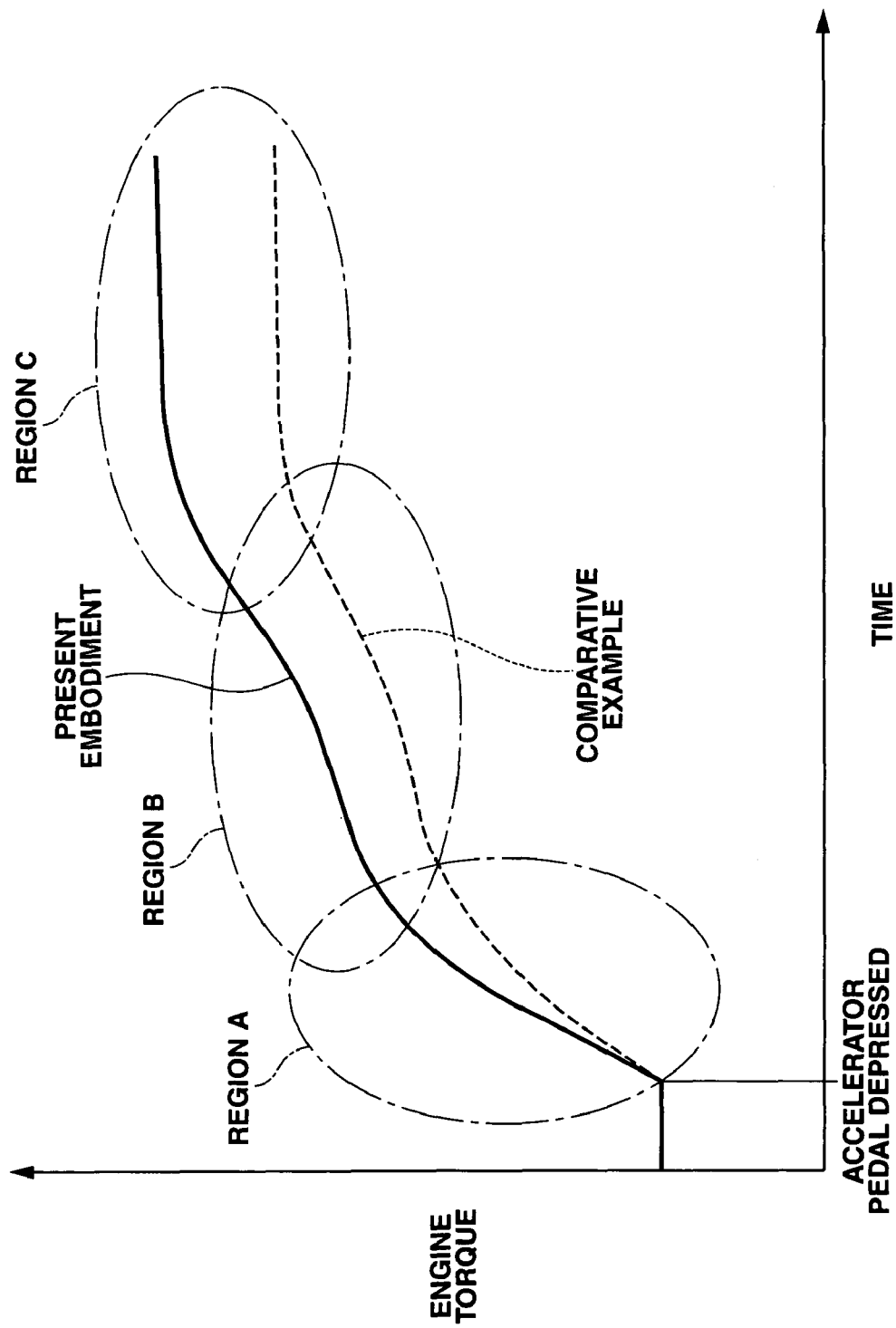

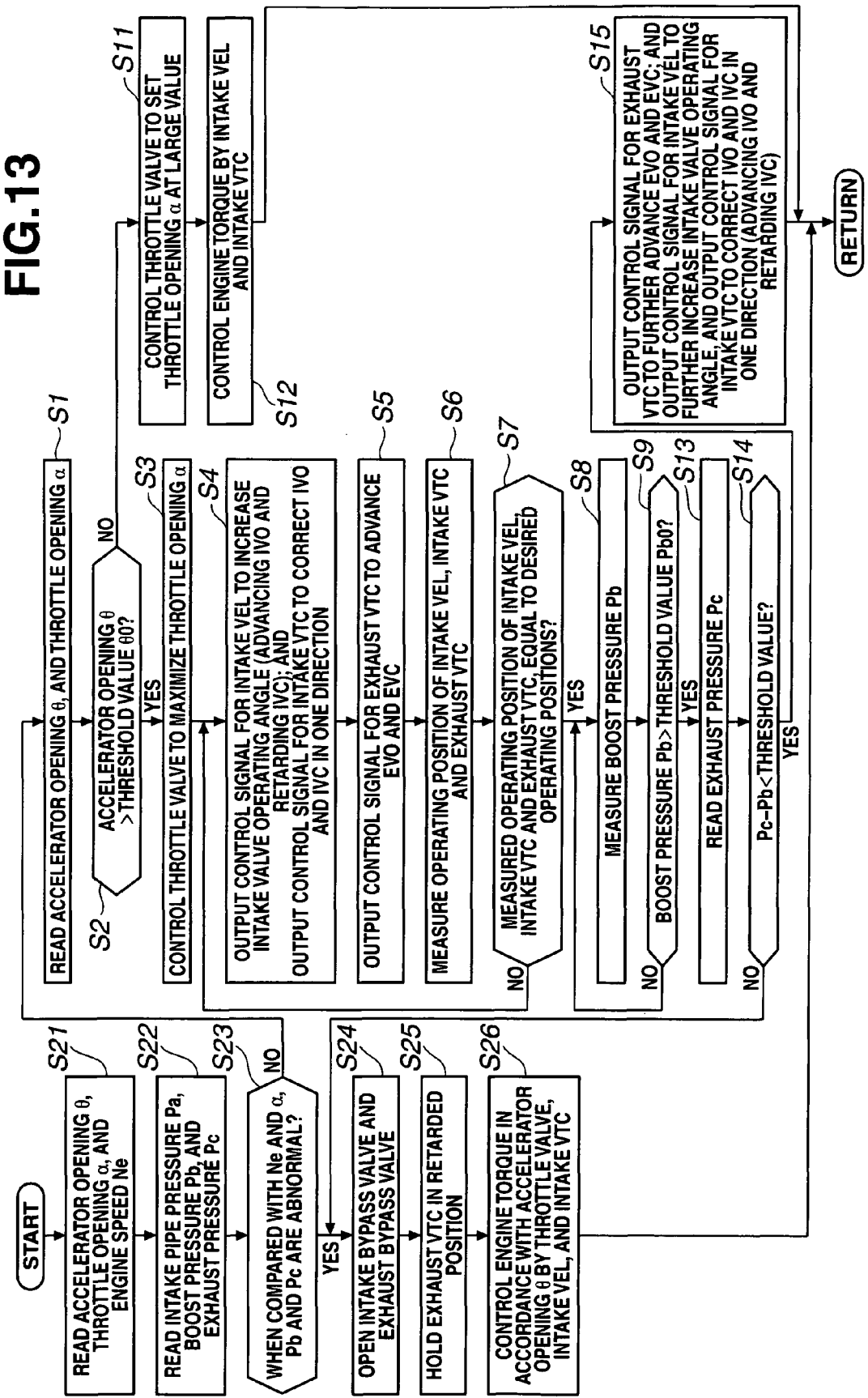

VARIABLE VALVE ACTUATING APPARATUS FOR INTERNAL COMBUSTION ENGINE AND PROCESS OF CONTROLLING THE SAME

BACKGROUND OF THE INVENTION

The present invention relates to variable valve actuating apparatuses or systems for controlling opening and closing timings of intake valves and exhaust valves of internal combustion engines provided with exhaust turbochargers.

Japanese Patent Application Publication No. 2003-3871 discloses a variable valve actuating system for an internal combustion engine provided with an exhaust turbocharger. When detecting that the engine is in a state of acceleration, this variable valve actuating system, at an initial stage of acceleration, advances opening and closing timings of an exhaust valve of the engine with respect to a normal setting employed before the detection that the engine is in the state of acceleration, and reduces a period of valve overlap in which both of the exhaust valve and an intake valve are open. After the initial stage of acceleration, the variable valve actuating system advances opening and closing timings of the intake valve. This process is intended for rapidly increasing the rotation speed of an exhaust turbine of the exhaust turbocharger in order to rapidly increase the boost pressure of the exhaust turbocharger at an initial stage of acceleration of the engine.

SUMMARY OF THE INVENTION

It is desirable to provide a variable valve actuating apparatus for an internal combustion engine with an exhaust turbocharger which is capable of allowing the engine to output a torque with a further improved response at an initial transient stage of acceleration of the engine, for example, at an initial transient stage of rapid acceleration of the engine.

According to one aspect of the present invention, a variable valve actuating apparatus for an internal combustion engine with an exhaust turbocharger, comprises: an intake valve characteristic varying section arranged to receive a first control signal, and vary at least an opening timing and a closing timing of an intake valve of the internal combustion engine in accordance with the first control signal; an exhaust valve characteristic varying section arranged to receive a second control signal, and vary at least an opening timing of an exhaust valve of the internal combustion engine in accordance with the second control signal; and a control section configured to: identify a desired value of an output of the internal combustion engine; and perform a valve characteristic control process in response to an increase in the desired value of the output, the valve characteristic control process including: advancing the opening timing of the intake valve, and retarding the closing timing of the intake valve, by outputting the first control signal to the intake valve characteristic varying section; and advancing the opening timing of the exhaust valve by outputting the second control signal to the exhaust valve characteristic varying section. The intake valve characteristic varying section may be arranged to vary at least an operating angle and a lift of the intake valve in accordance with the first control signal. The control section may be configured to: identify an accelerator opening of the internal combustion engine; perform a first control process, when the accelerator opening is below a predetermined threshold value, the first control process including: setting an opening of a throttle valve of the internal combustion engine above a predetermined value; and controlling the operating angle and the lift of the intake valve by the intake valve characteristic varying section so as to attain the desired value of the output; and perform a second control process, when the accelerator opening is above the predetermined threshold value, the second control process including: setting the opening of the throttle valve above the predetermined value; increasing the operating angle and the lift of the intake valve by the intake valve characteristic varying section; and advancing the opening timing of the exhaust valve by the exhaust valve characteristic varying section. The intake valve characteristic varying section may comprise: a first part arranged to continuously vary at least the operating angle and the lift of the intake valve; a second part arranged to continuously vary at least a maximum lift phase of the intake valve. The exhaust valve characteristic varying section may be arranged to vary at least the opening timing and a closing timing of the exhaust valve in accordance with the second control signal. The valve characteristic control process may include advancing both of the opening timing and the closing timing of the exhaust valve by the exhaust valve characteristic varying section. The control section may be configured to perform a second valve characteristic control process in response to an increase in a boost pressure of the exhaust turbocharger, the second valve characteristic control process including: increasing the operating angle and the lift of the intake valve by the intake valve characteristic varying section; and retarding the opening timing and the closing timing of the exhaust valve by the exhaust valve characteristic varying section. The exhaust valve characteristic varying section may be arranged to vary at least the opening timing and the closing timing of the exhaust valve, while holding constant an operating angle and a lift of the exhaust valve. The exhaust valve characteristic varying section may include a biasing device arranged to bias the exhaust valve characteristic varying section in a direction to advance the opening timing and the closing timing of the exhaust valve. The exhaust valve characteristic varying section may include a biasing device arranged to bias the exhaust valve characteristic varying section in a direction to retard the opening timing and the closing timing of the exhaust valve. The control section may be configured to reduce a valve overlap between the intake valve and the exhaust valve by setting an amount of advance of the closing timing of the exhaust valve to be larger than an amount of advance of the opening timing of the intake valve during the valve characteristic control process. The control section may be configured to perform a second valve characteristic control process, when detecting that a boost pressure of the exhaust turbocharger is above a predetermined threshold value, the second valve characteristic control process including: increasing an operating angle of the intake valve and advancing the opening timing of the intake valve by the intake valve characteristic varying section; and retarding the opening timing and the closing timing of the exhaust valve by the exhaust valve characteristic varying section. The control section may be configured to set an amount of advance of the opening timing of the intake valve to be larger than an amount of retard of the closing timing of the exhaust valve during the second valve characteristic control process. The control section may be configured to retard the opening timing and the closing timing of the exhaust valve by the exhaust valve characteristic varying section, when detecting an abnormality in the exhaust turbocharger. The control section may be configured to operate the intake valve characteristic varying section prior to the exhaust valve characteristic varying section during the valve characteristic control process. The control section may be configured to operate the exhaust valve characteristic varying section prior to the intake valve characteristic varying section during the valve characteristic control process. The control section may be configured to increase the desired value of the output in response to an increase in an accelerator opening of the internal combustion engine. The control section may be configured to: operate the intake valve characteristic varying section prior to the exhaust valve characteristic varying section, when a rotation speed of the internal combustion engine is below a predetermined threshold value; operate the exhaust valve characteristic varying section prior to the intake valve characteristic varying section, when the rotation speed of the internal combustion engine is above the predetermined threshold value.

According to another aspect of the present invention, a variable valve actuating apparatus for an internal combustion engine with an exhaust turbocharger, comprises: an intake valve characteristic varying section arranged to vary at least an operating angle and a lift of an intake valve of the internal combustion engine; an exhaust valve characteristic varying section arranged to vary at least an opening timing and a closing timing of an exhaust valve of the internal combustion engine; and a control section for controlling the intake valve characteristic varying section and the exhaust valve characteristic varying section in accordance with a desired value of an output of the internal combustion engine, the control section being configured to: perform a first valve characteristic control process in response to an increase in the desired value of the output, the first valve characteristic control process including: advancing an opening timing of the intake valve, and retarding a closing timing of the intake valve by the intake valve characteristic varying section; and advancing the opening timing of the exhaust valve by the exhaust valve characteristic varying section; and perform a second valve characteristic control process in response to an increase in a boost pressure of the exhaust turbocharger, the second valve characteristic control process including: increasing the operating angle and the lift of the intake valve by the intake valve characteristic varying section; and retarding the opening timing and the closing timing of the exhaust valve by the exhaust valve characteristic varying section. The control section may be configured to advance the opening timing and the closing timing of the exhaust valve by the exhaust valve characteristic varying section so as to reduce a valve overlap between the intake valve and the exhaust valve during the first valve characteristic control process.

According to a further aspect of the present invention, a process of controlling a variable valve actuating apparatus with an exhaust turbocharger, the variable valve actuating apparatus including an intake valve characteristic varying section arranged to vary at least an opening timing and a closing timing of an intake valve of an internal combustion engine, and an exhaust valve characteristic varying section arranged to vary at least an opening timing of an exhaust valve of the internal combustion engine, comprises: advancing the opening timing of the intake valve, and retarding the closing timing of the intake valve, and advancing the opening timing of the exhaust valve, in response to an increase in a desired value of an output of the internal combustion engine.

BRIEF DESCRIPTION OF THE DRAWINGS

FIG. 2 is a perspective view of an intake valve event and lift control mechanism, an intake valve timing control mechanism, and an exhaust valve timing control mechanism in the variable valve actuating system of FIG. 1.

FIG. 12 is a graphic diagram showing how engine torque changes with respect to time in response to accelerator pedal depression in cases of the internal combustion engine system of FIG. 1, and an internal combustion engine system according to a comparative example.

FIG. 13 is a flow chart showing another control process to be performed by the controller.

DETAILED DESCRIPTION OF THE INVENTION

Figure 1:
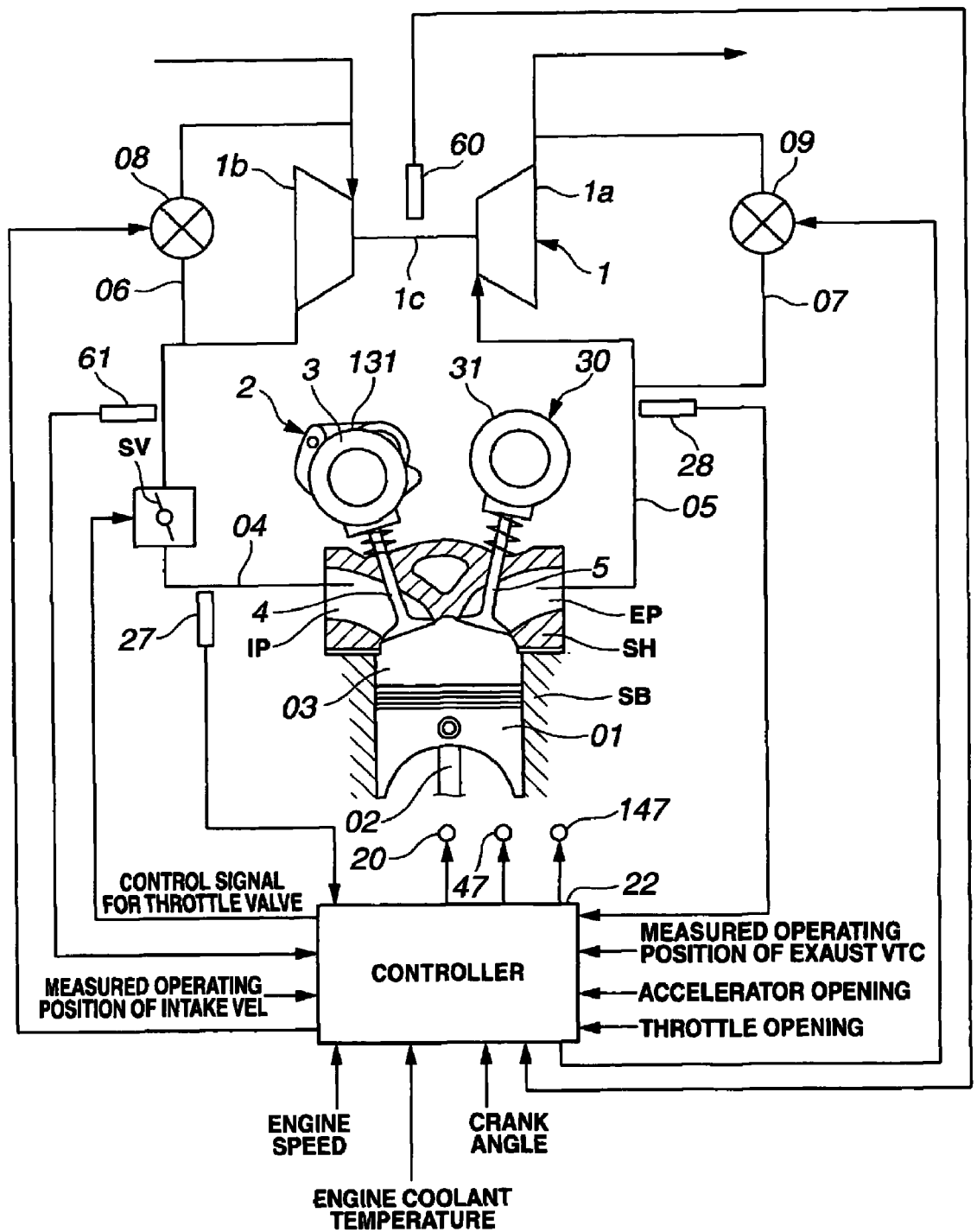
FIG. 1 is a schematic diagram showing an internal combustion engine system including a variable valve actuating system or apparatus according to an embodiment of the present invention.

FIG. 1 schematically shows an internal combustion engine system including a variable valve actuating system or apparatus according to an embodiment of the present invention. In this embodiment, the internal combustion engine system includes a multi-cylinder internal combustion engine.

As shown in FIG. 1, for each cylinder, a cylinder bore is formed in a cylinder block SB. A piston 01 is received in this cylinder bore so that piston 01 can slide up and down in the cylinder bore. Intake ports IP and exhaust ports EP are formed in a cylinder head SH. For each cylinder, there are provided a pair of intake valves 4, and a pair of exhaust valves 5 for opening and closing the respective open ends of the intake and exhaust ports IP and EP. Piston 01 is mechanically linked to a crankshaft not shown through a connecting rod 02. A combustion chamber 03 is formed between the crown of piston 01 and a lower surface of cylinder head SH. An intake pipe 04 includes an intake manifold connected to intake ports IP. An exhaust pipe 05 includes an exhaust manifold connected to exhaust ports EP. In intake pipe 04, on the upstream side of the intake manifold, there is provided a throttle valve SV for controlling the quantity (intake air quantity) of air inducted into combustion chamber 03. On the downstream side, there is provided a fuel injector not shown.

The engine system includes an exhaust turbocharger 1 disposed between intake pipe 04 and exhaust pipe 05.

Exhaust turbocharger 1 includes an exhaust turbine wheel 1a, an intake compressor wheel 1b, and a coupling shaft 1c. Exhaust turbine wheel 1a is arranged to rotate in exhaust pipe 05, receiving the pressure of an exhaust gas flowing through exhaust pipe 05. Intake compressor wheel 1b is coupled through coupling shaft 1c to exhaust turbine wheel 1a so that intake compressor wheel 1b can rotate with exhaust turbine wheel 1a so as to compress an intake air flowing through intake pipe 04, and send the compressed intake air to combustion chamber 03. Coupling shaft 1c fixedly couples exhaust turbine wheel 1a and intake compressor wheel 1b to each other, so as to allow exhaust turbine wheel 1a and intake compressor wheel 1b to rotate as a unit.

Intake pipe 04 is provided with an intake bypass passage 06 for bypassing the intake compressor wheel 1b of exhaust turbocharger 1. Exhaust pipe 05 is provided with an exhaust bypass passage 07 for bypassing the exhaust turbine wheel 1a of exhaust turbocharger 1. An intake bypass valve 08 is provided for opening and closing the intake bypass passage 06. An exhaust bypass valve 09 is provided for opening and closing the exhaust bypass passage 07.

The variable valve actuating system includes an intake valve characteristic varying section for intake valves 4, and an exhaust valve characteristic varying section for exhaust valves 5. The intake valve characteristic varying section is arranged to receive a control signal, and vary at least an operating angle and a lift or at least opening and closing timings of intake valves 4 in accordance with the control signal. Specifically, the intake valve characteristic varying section includes an intake valve event and lift control mechanism (Intake VEL, or intake valve lift varying mechanism) 2 for continuously varying (increasing or reducing) an operating angle (opening period) and a lift of intake valves 4, and an intake valve timing control mechanism (Intake VTC, or intake valve phase varying mechanism) 3 for continuously varying (advancing or retarding) opening and closing timings of intake valves 4, or continuously varying (advancing or retarding) a maximum lift phase (or central phase of valve operating angle) of intake valves 4. The exhaust valve characteristic varying section is arranged to receive a control signal, and vary at least the opening and closing timings of exhaust valves 5 in accordance with the control signal. Specifically, the exhaust valve characteristic varying section includes an exhaust valve timing control mechanism (Exhaust VTC, or exhaust valve phase varying mechanism) 30 for continuously varying (advancing or retarding) opening and closing timings of exhaust valves 5, or continuously varying (advancing or retarding) the maximum lift phase of exhaust valves 5, while holding constant the operating angle and the lift of exhaust valves 5.

Intake valve event and lift control mechanism 2 has a construction substantially identical to the construction disclosed in Japanese Patent Application Publication No. 2003-172112. As shown in FIG. 2, intake valve event and lift control mechanism 2 includes a hollow drive shaft 6 which is rotatably supported by bearings on an upper part of cylinder head SH; a drive cam 7 which is an eccentric rotary cam fixedly mounted on drive shaft 6; a pair of swing cams 9 which are swingably mounted on drive shaft 6, and arranged to open the intake valves 4, respectively, by sliding on top surfaces of valve lifters 8 provided in the upper ends of intake valves 4; and a linkage or motion transmitting mechanism arranged to transmit rotation of drive cam 7 to swing cams 9 for swing motion.

Drive shaft 6 is arranged to receive rotation from the crankshaft through a rotation transmitting mechanism which, in this example, is a chain drive including a timing sprocket 131 provided on one end of drive shaft 6, a driving sprocket provided on the crankshaft, and a timing chain not shown. When driven by the crankshaft, the drive shaft 6 rotates in the clockwise direction as shown by an arrow in FIG. 2.

Drive cam 7 is formed with a drive shaft receiving hole. Drive cam 7 is fixedly mounted on drive shaft 6 extending through the drive shaft receiving hole. The axis of drive cam 7 is offset in the radial direction from the axis of drive shaft 6 by a predetermined distance.

Figure 3A:
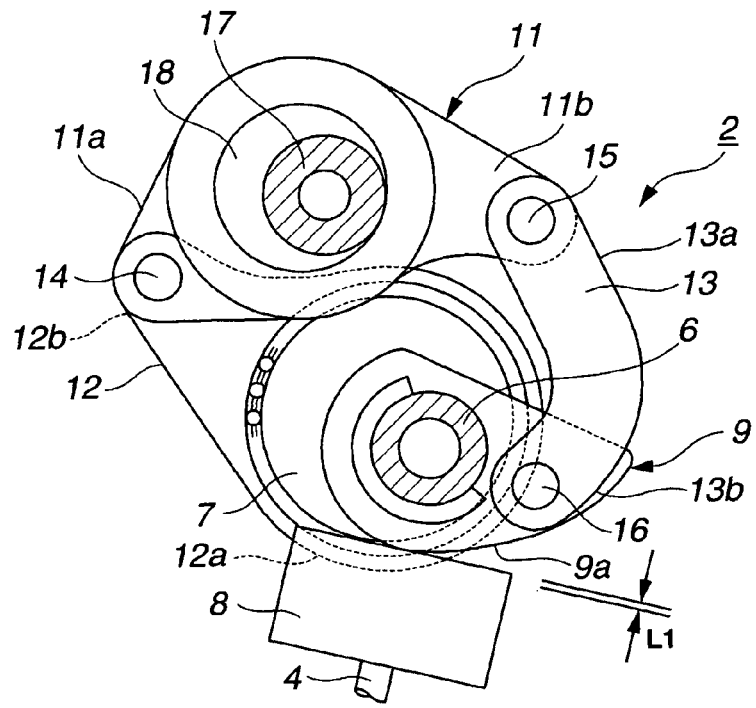
FIGS. 3A and 3B are diagrams illustrating how the intake valve event and lift control mechanism of FIG. 2 operates when controlled to be in a state of small valve lift.
Figure 3B:
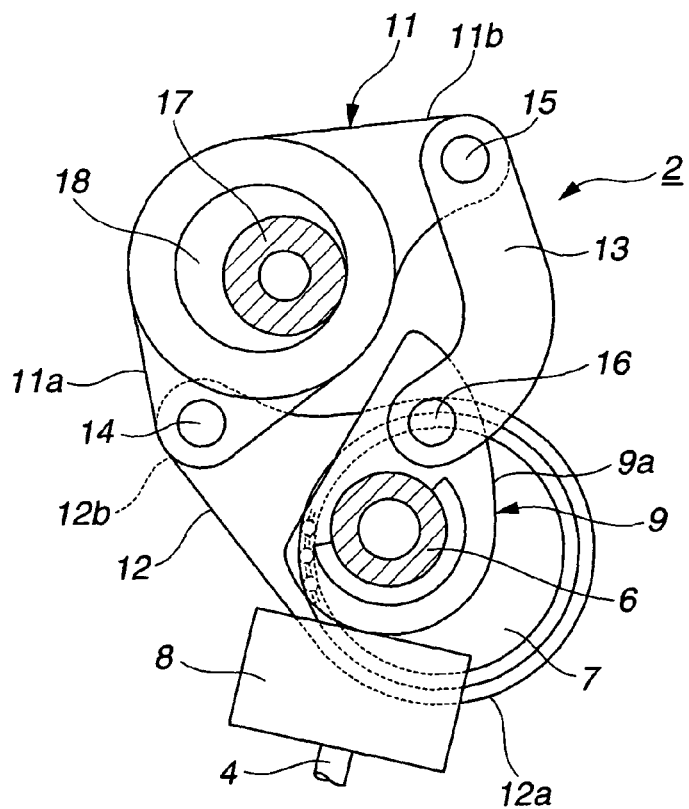

As shown in FIGS. 2, 3A and 3B, swing cams 9 are shaped identically like a raindrop, and formed integrally at both ends of an annular camshaft 10. Camshaft 10 is hollow and rotatably mounted on drive shaft 6. Each swing cam 9 has a lower surface including a cam surface 9a. Cam surface 9a includes a base circle surface region on the cam shaft's side, a ramp surface region extending like a circular arc from the base circle surface region toward a cam nose, and a lift surface region extending from the ramp surface region toward an apex of the cam nose. The cam surface abuts on the top surface of the corresponding valve lifter 8 at a predetermined position, and the contact point of the cam surface shifts among the base circle surface region, ramp surface region and lift surface region in dependence on the swing position of the swing cam 9.

The above-mentioned linkage or transmitting mechanism includes a rocker arm 11 disposed above drive shaft 6; a link arm 12 connecting a first end portion 11a of rocker arm 11 with drive cam 7; and a link rod 13 connecting a second end portion 11b of rocker arm 11 with one swing cam 9.

Rocker arm 11 includes a tubular central base portion formed with a support hole, and rotatably mounted on a control cam 18. The first end portion 11a of rocker arm 11 is connected rotatably with link arm 12 by a pin 14, and the second end portion 11b is connected rotatably with a first end portion 13a of link rod 13 by a pin 15.

Link arm 12 includes a relatively large annular base portion 12a and a projection 12b projecting outward from the base portion 12a. Base portion 12a is formed with a center hole in which the cam portion of the drive cam 7 is rotatably fit. The projection 12b is connected rotatably with the first end portion 11a of rocker arm 11 by pin 14.

Link rod 13 includes a second end 13b which is connected rotatably with the cam nose of swing cam 9 by a pin 16.

Control shaft 17 extends in parallel to drive shaft 6 in the longitudinal direction of the engine, and is rotatably supported by the same bearings at a position just above drive shaft 6. Control cam 18 is fixedly mounted on control shaft 17 and fit slidably in the support hole of rocker arm 11 to serve as a fulcrum for the swing motion of rocker arm 11. Control cam 18 is shaped like a hollow cylinder, and the axis of control cam 18 is offset from the axis of the control shaft 17 by a predetermined amount. Rotation of control shaft 17 is controlled by a drive mechanism 19.

Drive mechanism 19 includes an electric motor 20 which is fixed to one end of a housing; and a transmission mechanism 21 to transmit rotation of the electric motor 20 to the control shaft 17. In this example, the transmission mechanism 21 is a ball screw transmission mechanism.

Ball screw transmission mechanism 21 includes a ball screw shaft 23, a ball nut 24, a connection arm 25 and a link member 26. Ball screw shaft 23 and the drive shaft of electric motor 20 are arranged end to end and aligned with each other so that their axes form a substantially straight line. Ball nut 24 serves as a movable nut screwed on the ball screw shaft 23 and arranged to move axially in accordance with the rotation.

Connection arm 25 is connected with one end portion of control shaft 17. Link member 26 links the connection arm 25 and ball nut 24.

Ball screw shaft 23 is formed with an external single continuous ball circulating groove extending, in the form of a helical thread, over the outside surface of ball screw shaft 23. Ball screw shaft 23 and the drive shaft of electric motor 20 are connected end to end by a coupling member which transmits a rotational driving force from electric motor 20 to ball screw shaft 23. Ball nut 24 is approximately in the form of a hollow cylinder. Ball nut 24 is formed with an internal guide groove designed to hold a plurality of balls in cooperation with the ball circulating groove of ball screw shaft 23 so that the balls can roll between the guide groove and the circulating groove. This guide groove is a single continuous helical thread formed in the inside circumferential surface of ball nut 24. Ball nut 24 is arranged to translate the rotation of ball screw shaft 23 into a linear motion of ball nut 24 and produce an axial force. A coil spring 24a is provided to urge the ball nut 24 axially toward electric motor 20, and thereby to eliminate a backlash clearance with ball screw shaft 23. It is to be understood from the following description that coil spring 24a serves to bias the ball nut 24 in the direction to reduce the lift and operating angle of intake valves 4.

Electric motor 20 of this example is a proportional type DC motor. Electric motor 20 is controlled by a controller 22 in accordance with a measured operating state of the engine.

Controller 22 of this example is a common control unit or control section used for controlling all of intake valve event and lift control mechanism 2, intake valve timing control mechanism 3, and exhaust valve timing control mechanism 30. Controller 22 is connected with various sensors to collect information on the operating state the engine. Controller 22 receives data signals outputted from the sensors, and identifies the engine operating state on the basis of the data signals. The sensors include a crank angle sensor for sensing the rotation angle of the crankshaft, an engine coolant temperature sensor for sensing the temperature of an engine coolant, an intake pipe pressure sensor 27 for sensing an intake pipe pressure Pa in intake pipe 04 on the downstream side of throttle valve SV, an exhaust pressure sensor 28 for sensing an exhaust pressure Pc in exhaust pipe 05, an accelerator opening sensor for sensing an accelerator opening degree, a throttle sensor for sensing the opening degree of throttle valve SV, a control shaft angle sensor 29 for sensing the rotation angle of control shaft 17, a drive shaft angle sensor 128 for sensing the rotation angle of drive shaft 6, a turbine rotation sensor 60 for sensing the rotation of exhaust turbine wheel 1a, and a boost pressure sensor 61 for sensing a boost pressure in intake pipe 04 on the upstream side of throttle valve SV. Controller 22 measures the relative rotational position between timing sprocket 131 and drive shaft 6 on the basis of the data signals from the crank angle sensor and drive shaft angle sensor 128.

Controller 22 produces control signals, and controls intake bypass valve 08, exhaust bypass valve 09, throttle valve SV, a directional control valve 147 of intake valve timing control mechanism 3, and a directional control valve 47 of exhaust valve timing control mechanism 30 in accordance with the engine operating state, by sending the control signals to the same.

The thus-constructed intake valve event and lift control mechanism 2 operates as follows. When the engine is operating in a predetermined low speed and low load region after starting operation, the controller 22 acts to move the ball nut 24 rectilinearly toward electric motor 20, by sending a control current to electric motor 20 and rotating the ball screw shaft 23 with electric motor 20. With this movement of ball nut 24, the control shaft 17 is rotated in one direction by the link member 26 and connection arm 25. Accordingly, control cam 18 rotates about the axis of control shaft 17 so that the axis of control cam 18 rotates about the axis of control shaft 17, as shown in FIGS. 3A and 3B (in the form of rear view), and a thick wall portion of control cam 18 is shifted upwards from drive shaft 6. As a result, the pivot point between the second end portion 11b of rocker arm 11 and link rod 13 is shifted upwards relative to the drive shaft 6. Therefore, each swing cam 9 is rotated in the counterclockwise direction as viewed in FIGS. 3A and 3B, and the cam nose is pulled upwards by link rod 13. Accordingly, drive cam 7 rotates and pushes up the first end portion 11a of rocker arm 11 through link arm 12. Though a movement for valve lift is transmitted through link rod 13 to swing cam 9 and valve lifter 16, the valve lift is decreased sufficiently to a small lift L1 shown by a valve lift curve in FIG. 5, and the operating angle (valve opening period) D is decreased to a small value D1. This setting is suitable, when boost pressure Pb is low, or below a predetermined threshold value.

Engine starting operation is started, when an ignition switch is turned on. First, a starter motor is driven to rotate, so as to allow the crankshaft to start to rotate. During an initial stage of engine cranking operation, the valve lift is maintained to be small under the influence of the biasing force of coil spring 24a. The valve operating angle is also small so that the closing timing of intake valves 4 (intake valve closing timing IVC) is on the advance side of bottom dead center. The small valve operating angle, small valve lift, and thereby, low friction, as well as the effect of decompression, serve to quickly increase the engine speed during engine cranking operation. The valve operating angle D is small, and the opening timing of intake valves 4 (intake valve opening timing IVO) is on the retard side of top dead center. Therefore, there is no overlap between the operating angle of intake valves 4 and the operating angle of exhaust valves 5. This is suitable for engine starting operation and low boost pressure operation.

When the engine is operating in a middle speed and middle load region thereafter, the controller 22 drives electric motor 20 in a reverse rotational direction, and thereby rotates the ball screw shaft 23 in the reverse direction. With this reverse rotation of ball screw shaft 23, the ball nut 24 moves in the axial direction away from electric motor 20, and control shaft 17 is rotated in the counterclockwise direction as viewed in FIGS. 3A and 3B by a predetermined amount. Therefore, the control cam 18 is held at the angular position at which the axis of control cam 18 is shifted downward by a predetermined amount from the axis of control shaft 17, and the thick wall portion of control cam 18 is shifted downwards. Rocker arm 11 is moved in the clockwise direction from the position of FIGS. 3A and 3B, and the end of rocker arm 11 pushes down the cam nose of swing cam 9 through link member 13, and swing cam 9 rotates in the clockwise direction slightly. Accordingly, drive cam 7 rotates and pushes up the end 11a of rocker arm 11 through link arm 12. A movement for valve lift is transmitted through link member 13 to swing cams 9 and valve lifters 8. In this case, the valve lift is increased to a medium lift L2, and the operating angle is increased to a medium angle D2.

Figure 4A:
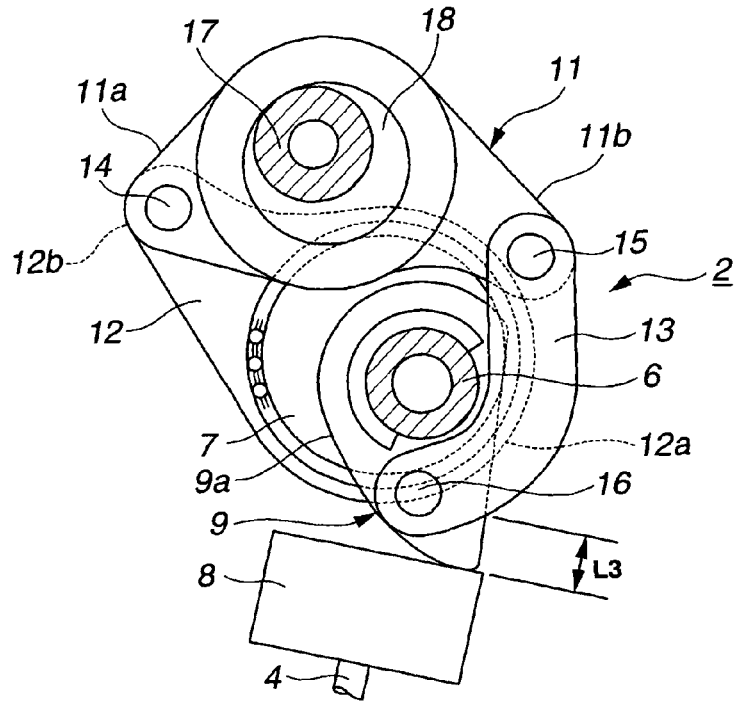
FIGS. 4A and 4B are diagrams illustrating how the intake valve event and lift control mechanism of FIG. 2 operates when controlled to be in a state of maximum valve lift.
Figure 4B:
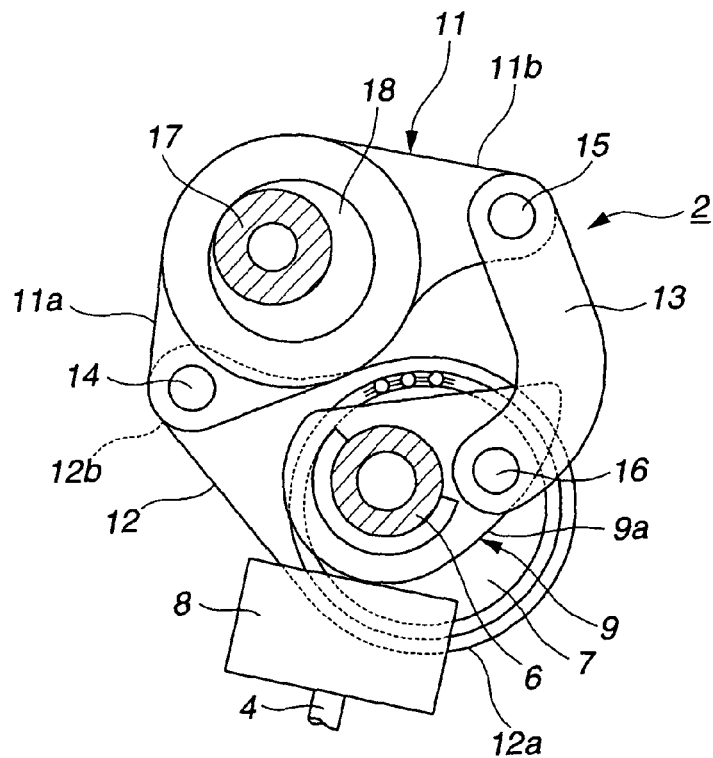
Figure 5:
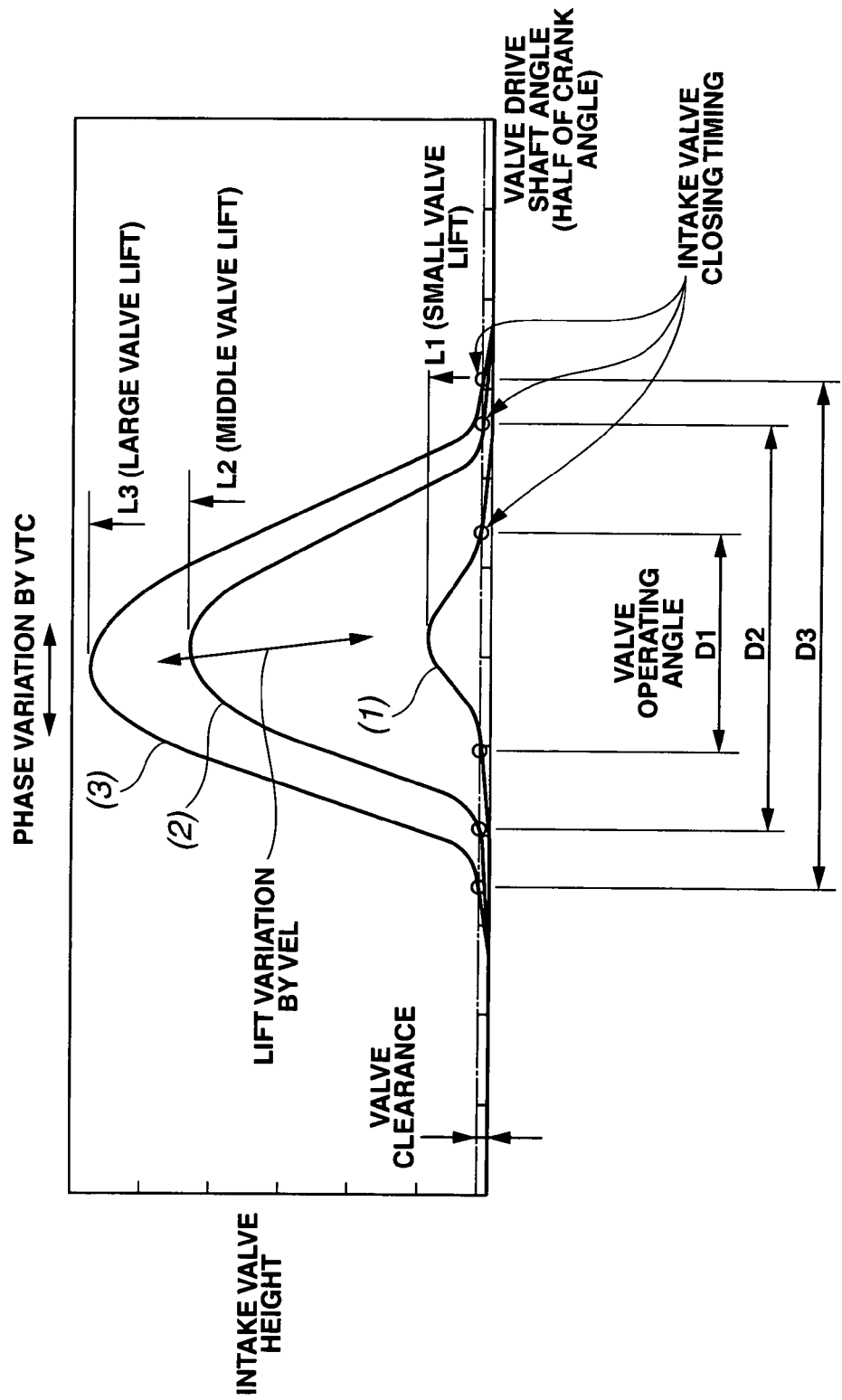
FIG. 5 is a graphic diagram showing how the lift, operating angle, and maximum lift phase of an intake valve of the engine are controlled by the variable valve actuating system of FIG. 1.

When the engine operating point enters a high speed and high load region, this variable valve actuating system can rotate electric motor 20 in the reverse direction by sending the control signal from controller 22, to rotate control cam 18 further in the counterclockwise direction with control shaft 17 to the position at which the axis is rotated downwards as shown in FIGS. 4A and 4B. Therefore, rocker arm 11 moves to a position closer to the drive shaft 6, and the second end 11b pushes down the cam nose of swing cam 9 through link rod 13, so that the swing cam 9 is further rotated in the clockwise direction by a predetermined amount. Accordingly, drive cam 7 rotates and pushes up the first end 11a of rocker arm 11 through link arm 12. A movement for valve lift is transmitted through link rod 13 to swing cam 9 and valve lifter 8. In this case, the valve lift is increased continuously from L2 to L3 as shown in FIG. 5.

In this way, intake valve event and lift control mechanism 2 varies the lift of intake valves 4 continuously from the small lift L1 to the large lift L3, and also, the operating angle of intake valves 4 continuously from the small angle (angular distance) D1 to the large angle D3.

During the foregoing operation of intake valve event and lift control mechanism 2, the lift and operating angle of intake valves 4 change gradually and continuously in a nearly steady state in accordance with a desired engine operating state so that the engine operating state conforms to the desired operating state in a nearly steady state. However, when a quick acceleration is requested so that the engine operating state needs to change through a transient process to the desired operating state, the controller 22 operates intake valve event and lift control mechanism 2 in a different manner, as described in detail below.

Figure 6:
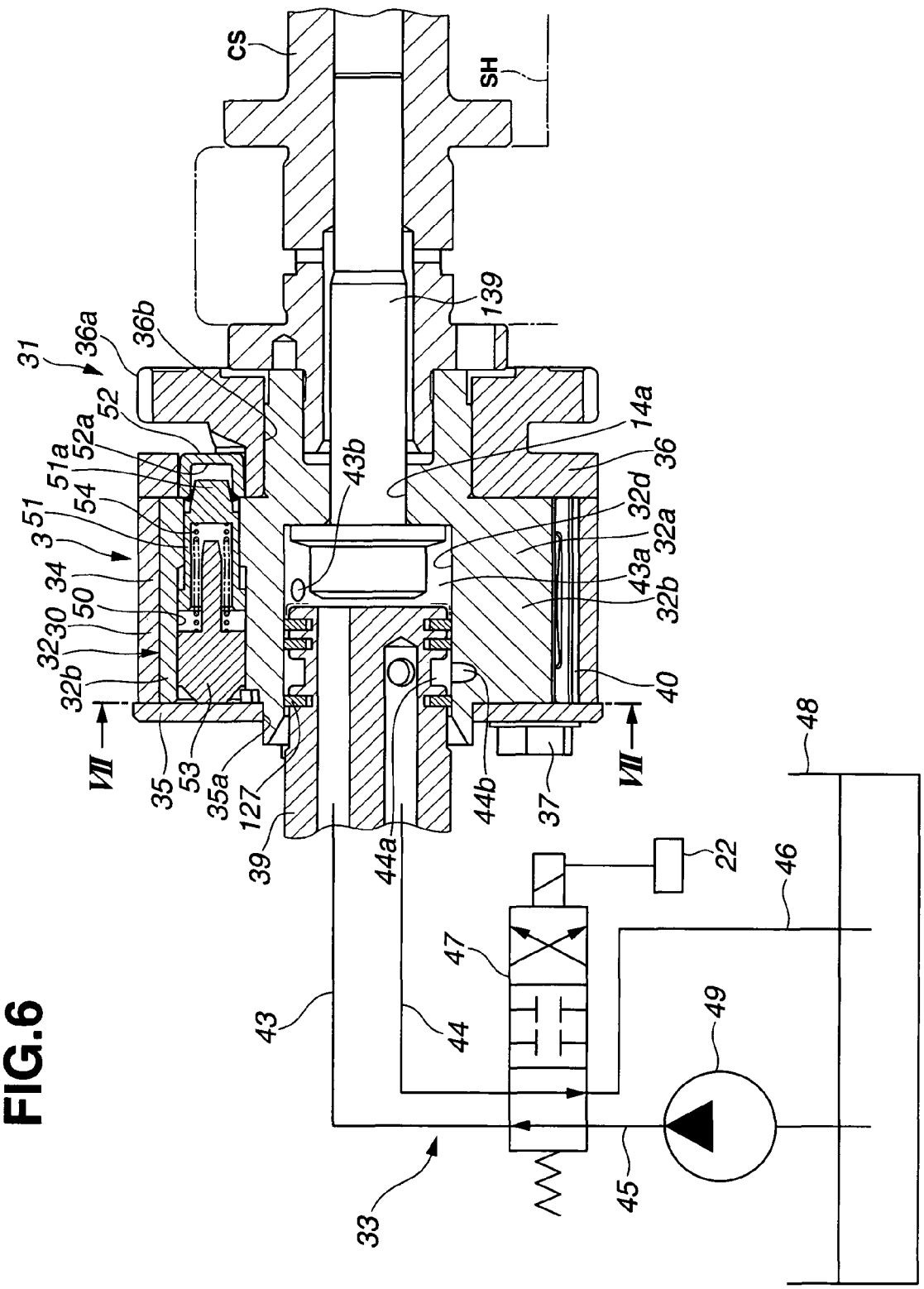
FIG. 6 is a sectional view of the exhaust valve timing control mechanism in the variable valve actuating system of FIG. 1.
Figure 7:
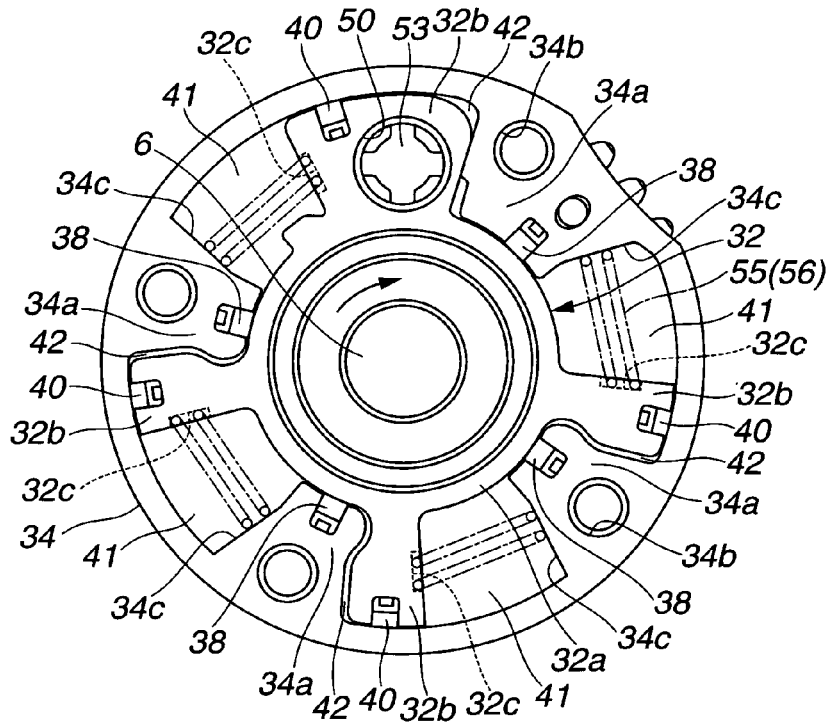
FIG. 7 is a sectional view, taken along a line VII-VII shown in FIG. 6, of the exhaust valve timing control mechanism under a condition that the exhaust valve timing control mechanism is controlled to be in a most advanced state.

In this example, intake valve timing control mechanism 3 and exhaust valve timing control mechanism 30 are identical ones of a vane type. The following describes the construction of exhaust valve timing control mechanism 30. As shown in FIGS. 6 and 7, the exhaust valve timing control mechanism 30 includes a timing sprocket 31 for transmitting rotation to drive shaft 6; a vane member 32 which is fixed to an exhaust camshaft CS and received rotatably in the timing sprocket 31; and a hydraulic circuit 33 to rotate vane member 32 in the forward and reverse directions by the use of an oil pressure.

Timing sprocket 31 includes a housing 34 receiving the vane member 32 rotatably; a front cover 35 shaped like a circular disk and arranged to close a front opening of housing 34; and a rear cover 36 shaped approximately like a circular disk and arranged to close a rear opening of housing 34. Housing 34 is sandwiched between front and rear covers 35 and 26, and joined with these covers to form a unit, by four small diameter bolts 37 extending in the axial direction of drive shaft 6.

Housing 34 is in the form of a hollow cylinder having the front and rear openings. Housing 34 includes a plurality of shoes 34a projecting radially inwards from the inside circumferential surface and serving as a partition. In this example, four of the shoes 34a are arranged at intervals of about 90 degrees.

Each shoe 34a has an approximately trapezoidal cross section. A bolt hole 34b is formed approximately at the center of each shoe 34a. Each bolt hole 34b passes axially through one of shoes 34a, and receives the shank of one of the axially extending bolts 37. Each shoe 34a includes an inner end surface. A retaining groove extends axially in the form of cutout in the inner end surface of each shoe 34a at a higher position. A U-shaped seal member 38 is fit in each retaining groove, and urged radially inwards by a leaf spring not shown fit in the retaining groove.

Front cover 35 includes a center support hole 35a having a relatively large inside diameter; and four bolt holes not shown each receiving one of the axially extending bolts 37. These four bolt holes are arranged around the center support hole 35a.

Rear cover 36 includes a toothed portion 36a formed integrally on the rear side, and arranged to engage with the before-mentioned timing chain; and a center bearing hole 36b having a relatively large inside diameter and extending axially through rear cover 36.

Vane member 32 includes a central vane rotor 32a and a plurality of vanes 32b projecting radially outwards from the vane rotor 32a. In this example, four of the vanes 32b are arranged at angular intervals of approximately 90 degrees circumferentially around vane rotor 32a. Vane rotor 32a is annular and includes a center bolt hole 14a at the center. Vanes 32b are integral with vane rotor 32a. Vane member 32 is fixed to the front end of exhaust camshaft CS by a fixing bolt 139 extending axially through the center bolt hole 14a of vane rotor 32a.

The vane rotor 32a includes a front side small diameter tubular portion supported rotatably by the center support hole 35a of front cover 35, and a rear side small diameter tubular portion supported rotatably by the bearing hole 36b of rear cover 36.

Figure 8:
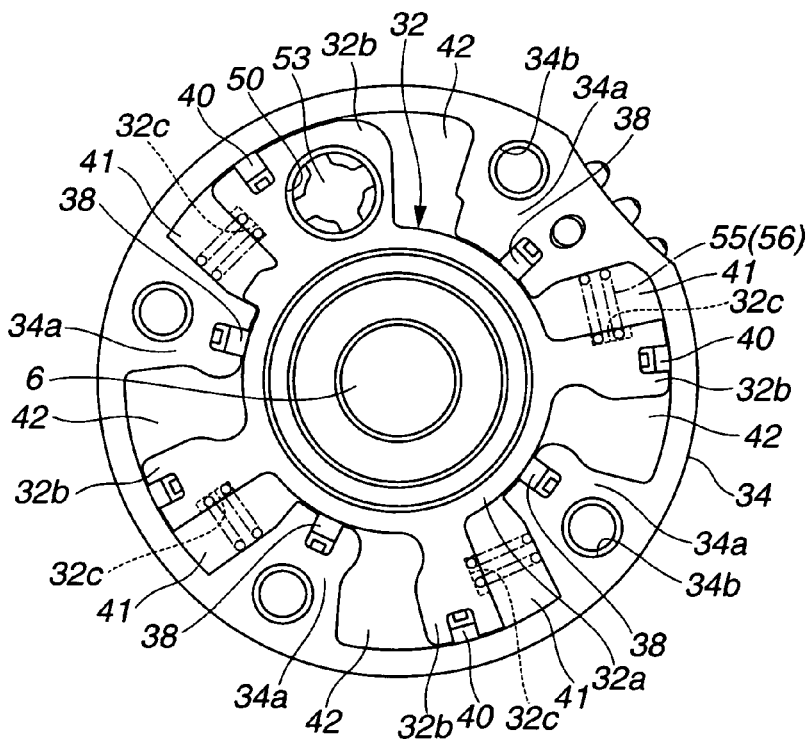
FIG. 8 is a sectional view, taken along the line VII-VII shown in FIG. 6, of the exhaust valve timing control mechanism under a condition that the exhaust valve timing control mechanism is controlled to be in a most retarded state.

Three of the four vanes 32b are smaller vanes shaped approximately like a relatively long rectangle, and the remaining one is a larger vane shaped like a relatively large trapezoid. The smaller vanes 32b are approximately equal in circumferential width whereas the larger vane 32b has a larger circumferential width greater than that of each of the smaller vanes 32b so that a weight balance is attained as a whole of vane member 32. The four vanes 32b of vane member 32 and the four shoes 34a of housing 34 are arranged alternately in the circumferential direction around the center axis, as shown in FIGS. 7 and 8. Each vane 32b includes an axially extending retaining groove receiving a U-shaped seal member 40 in sliding contact with the inside cylindrical surface of housing 34, and a leaf spring not shown for urging the seal member 40 radially outwards and thereby pressing the seal member 40 to the inside cylindrical surface of housing 34. Moreover, in one side of each vane 32b facing in the direction opposite to the rotational direction of exhaust camshaft CS, there are formed two circular recesses 32c.

An advance fluid pressure chamber 41 and a retard fluid pressure chamber 42 are formed on both sides of each vane 32b. Accordingly, there are four of the advance fluid pressure chambers 41 and fourth of the retard fluid pressure chambers 42.

Hydraulic circuit 33 includes a first fluid passage 43 leading to the advance fluid pressure chambers 41 to supply and drain an advance fluid pressure of an operating oil to and from advance fluid pressure chambers 41; a second fluid passage 44 leading to the retard fluid pressure chambers 42 to supply and drain a retard fluid pressure of the operating oil to and from retard fluid pressure chambers 42; and directional control valve or selector valve 47 connecting the first fluid passage 43 and second fluid passage 44 selectively with a supply passage 45 and a drain passage 46. A fluid pump 49 is connected with supply passage 45, and arranged to draw the hydraulic operating fluid or oil from an oil pan 48 of the engine, and to force the fluid into supply passage 45. Pump 49 is a one-way type pump. The downstream end of drain passage 46 is connected to oil pan 48, and arranged to drain the fluid to oil pan 48.

First and second fluid passages 43 and 44 include sections formed in a cylindrical portion 39 which is inserted, from a first end, through the small diameter tubular portion of vane rotor 32a, into the support hole 32d of vane rotor 32a. A second end of the cylindrical portion 39 is connected with directional control valve 47.

Between the outside circumferential surface of the cylindrical portion 39 and the inside circumferential surface of support hole 32d, there are provided three annular seal members 127 fixedly mounted on the cylindrical portion 39 near the forward end and arranged to seal the first and second fluid passages 43 and 44 off from each other.

First fluid passage 43 includes a passage section 43a serving as a pressure chamber, and four branch passages 43b connecting the passage section 43a, respectively, with the four advance fluid pressure chambers 41. Passage section 43a is formed in an end portion of support hole 32d on the side of exhaust camshaft CS. The four branch passages 43b are formed in vane rotor 32a and extend radially in vane rotor 32a.

Second fluid passage 44 includes an axially extending passage section extending axially in the cylindrical portion 39 to a closed end; an annular chamber 44a formed around the axially extending passage section near the closed end; and an L-shaped passage section 44b connecting the annular chamber 44a with each retard pressure chamber 42.

Directional control valve 47 of this example is a solenoid valve having four ports and three positions. A valve element inside the directional control valve 47 is arranged to alter the connection between first and second fluid passages 43 and 44 and the supply and drain passages 45 and 46 under the control of the controller 22. Directional control valve 47 is controlled to supply the operating oil to advance fluid pressure chamber 41 at the time of engine starting operation, and to supply the operating oil to retard fluid pressure chamber 42 after engine starting operation.

Exhaust valve timing control mechanism 30 includes a lock mechanism disposed between vane member 32 and housing 34 for locking or allowing the rotation of vane member 32 with respect to housing 34. Specifically, this lock mechanism is disposed between rear cover 36 and the larger vane 32b. As shown in FIG. 6, the lock mechanism includes a slide hole 50, a lock pin 51, a lock recess 52a, a spring retainer 53, and a coil spring 54. Slide hole 50 is formed in the larger vane 32b, extending in the axial direction of exhaust camshaft CS. Lock pin 51 is cup-shaped, disposed in slide hole 50, and slidably supported on slide hole 50. Lock recess 52a is formed in a portion 52 fixed to a hole defined in rear cover 36, and arranged to receive a tip portion 51a of lock pin 51. The tip portion 51a is tapered. Spring retainer 53 is fixed to a bottom portion of slide hole 50. Coil spring 54 is retained by spring retainer 53, and arranged to bias the lock pin 51 toward the lock recess 52a.

The lock recess 52a is hydraulically connected to retard fluid pressure chamber 42 or pump 49 through a fluid passage not shown, and receives the hydraulic pressure in retard fluid pressure chamber 42 or the discharge pressure of the pump.

When vane member 32 is in the most advanced position with respect to housing 34, the lock pin 51 is biased by coil spring 54 toward lock recess 52a so that the tip portion 51a of lock pin 51 is fit in lock recess 52a. The relative rotation between timing sprocket 31 and exhaust camshaft CS is thus locked. When lock recess 52a receives the hydraulic pressure in retard fluid pressure chamber 42 or the discharge pressure of the oil pump, then lock pin 51 moves away from lock recess 52a, so as to release exhaust camshaft CS with respect to timing sprocket 31.

Between one side surface of each vane 32b and a confronting side surface 10b of an adjacent one of the shoes 34a, there are disposed a pair of coil springs 55 and 56 serving as biasing means for urging the vane member 32 in the advance rotational direction. In other words, coil springs 55 and 56 serve as a biasing device arranged to bias exhaust valve timing control mechanism 30 in a direction to advance the opening timing and the closing timing of exhaust valves 5.

Though the two coil springs 55 and 56 are overlapped in FIGS. 7 and 8, the two coil springs 55 and 56 extend separately in parallel to each other. The two coil springs 55 and 56 have an equal axial length (coil length) which is longer than the spacing between the one side surface of the corresponding vane 32b and the confronting side surface of the adjacent shoe 34a. The two coil springs 55 and 56 are spaced with such an interaxis distance that the springs 55 and 56 do not contact each other even when the springs 55 and 56 are compressed to the maximum extent. The two coil springs 55 and 56 are connected through a retainer shaped like a thin sheet and fit in the recesses 32c of the corresponding shoe 34a.

The thus-constructed valve timing control mechanism 30 is controlled to operate as follows. At the time of stop of the engine, the controller 22 stops the output of the control current to directional control valve 47, and stops the operation of pump 49. Accordingly, vane member 32 is biased by coil springs 55, 56, so as to rotate in the clockwise direction about the axial direction of exhaust camshaft CS as viewed in FIG. 7. As a result, vane member 32 is brought into a position such that the larger vane 32b is in contact with the confronting side surface of shoe 34a. Exhaust camshaft CS is thus in the most advanced position with respect to timing sprocket 31. Simultaneously, the tip portion 51a of lock pin 51 is inserted into lock recess 52a, so as to prevent exhaust camshaft CS from rotating with respect to timing sprocket 31.

At the time of starting operation of the engine, the controller 22 outputs a control signal for directional control valve 47 to connect supply passage 45 and second fluid passage 44 to each other, and connect drain passage 46 and first fluid passage 43 to each other. Accordingly, the oil pressure discharged by pump 49 is supplied through drain passage 46 and second fluid passage 44 to retard fluid pressure chamber 42, while the oil pressure is drained from advance fluid pressure chamber 41 through first fluid passage 43 and drain passage 46 to oil pan 48 so that advance fluid pressure chamber 41 remains in a low-pressure state. The oil pressure is supplied to lock recess 52a as well as retard fluid pressure chamber 42, so that lock pin 51 moves back against the biasing force of coil spring 54, and the tip portion 51a is moves out of lock recess 52a. Accordingly, vane member 32 is unlocked with respect to housing 34, and is rotated in the counterclockwise direction by the increased pressures in retard fluid pressure chambers 42, against the spring forces of coil springs 55 and 56, as shown in FIG. 8. Consequently, exhaust camshaft CS rotates to the retard side, relative to timing sprocket 31, retarding the opening timing of the exhaust valves 5 (exhaust valve opening timing EVO). Thus, exhaust valves 5 open after the combustion is adequately progressed or completed. This results in a decrease in the exhaust emission level of the engine.

When the engine enters a predetermined low speed region thereafter, then the controller 22 operates the directional control valve 47 to the position connecting the supply passage 45 with first fluid passage 43 and connecting the drain passage 46 with second fluid passage 44. Therefore, the oil pressure in retard fluid pressure chambers 42 is decreased by return through second fluid passage 44 and drain passage 46 to oil pan 48, whereas the oil pressure in advance fluid pressure chambers 41 is increased by supply of the oil pressure. Vane member 32 rotates in the clockwise direction by the high pressure in advance fluid pressure chambers 41 and the spring forces of coil springs 55 and 56, and thereby shifts the relative rotational phase of exhaust camshaft CS relative to timing sprocket 31 to the advance side. This advance control is employed, during an initial transient stage of engine acceleration, as described in detail below.

When the engine enters another predetermined engine operating region, the oil pressure in advance fluid pressure chambers 41 decreases, the oil pressure in retard fluid pressure chambers 42 increases, and hence the vane member 32 shifts the relative rotational phase of exhaust camshaft CS relative to timing sprocket 31 to the retard side, against the spring forces of coil springs 55 and 56, as shown in FIG. 8.

When the engine is operating in another predetermined engine operating region, the controller 22 controls vane member 32 to be in a medium position between the most advanced position and the most retarded position, and controls directional control valve 47 to be in a position shutting off both of supply passage 45 and drain passage 46. This allows to set and hold the vane member 32 to any medium position.

Controller 22 sets desired values of controlled variables of intake valve event and lift control mechanism 2, intake valve timing control mechanism 3, exhaust valve timing control mechanism 30, throttle valve SV, intake bypass valve 08, and exhaust bypass valve 09, on the basis of the engine operating state, and outputs corresponding control signals to them. Of those controlled objects, intake valve event and lift control mechanism 2, intake valve timing control mechanism 3, and exhaust valve timing control mechanism 30 are controlled by feedback control with constantly monitoring actual operating positions of them. Especially when the engine is operating in a state of acceleration (a transient phase of acceleration), intake valve event and lift control mechanism 2 and exhaust valve timing control mechanism 30 are controlled in a special manner, to improve the response of exhaust turbocharger 1, and improve the response of the engine torque (torque response) at an initial stage of acceleration.

Figure 9:
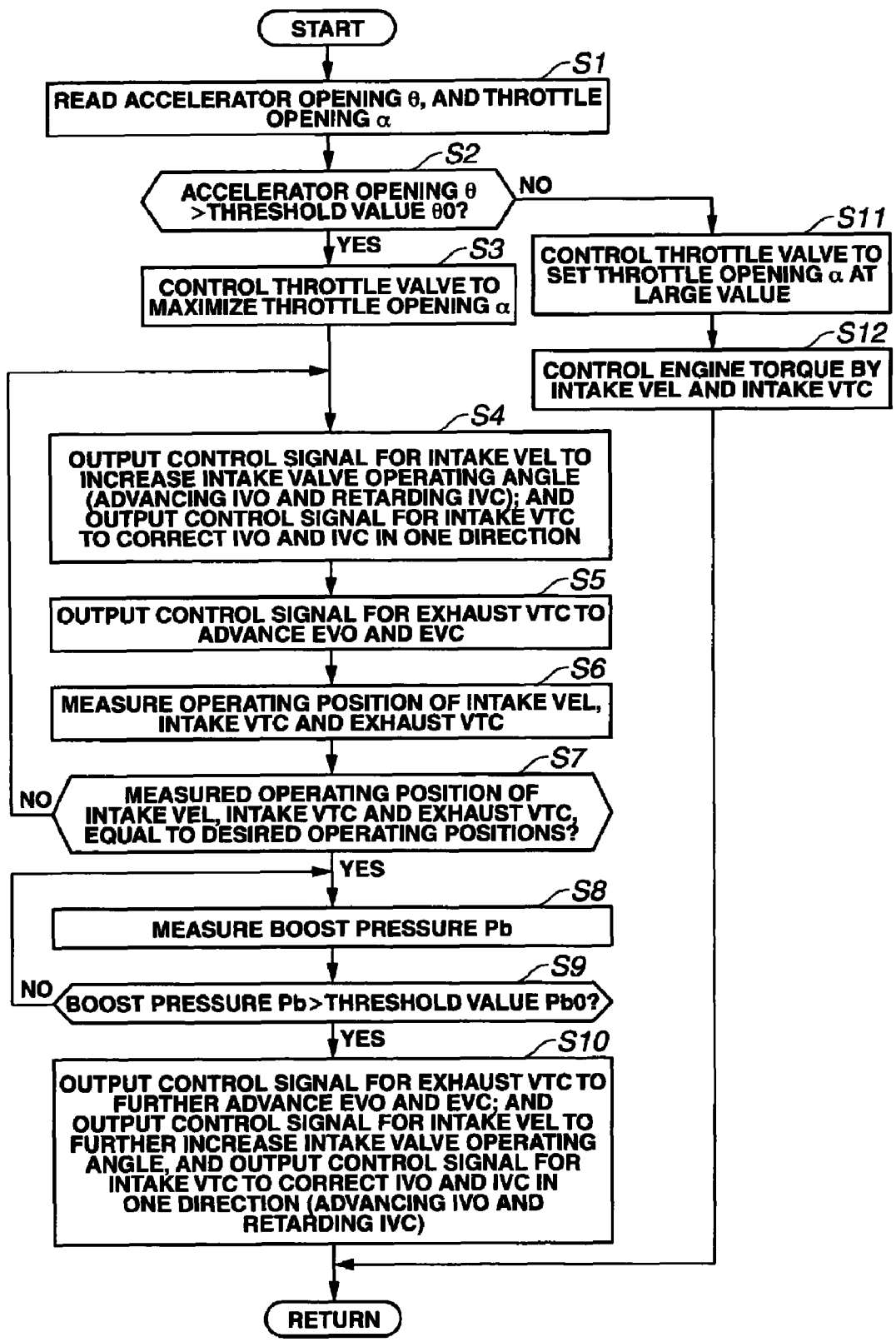
FIG. 9 is a flow chart showing a control process to be performed by a controller in the variable valve actuating system of FIG. 1.

FIG. 9 shows a control process to be performed by controller 22 to improve the torque response of the engine. At Step S1, after engine starting operation, the controller 22 reads or identifies an accelerator opening θ on the basis of the data signal outputted from the accelerator opening sensor, and a throttle opening α on the basis of the data signal outputted from the throttle opening sensor. Thus, controller 22 identifies a desired value of an output of the engine. The desired value of the engine output is set to increase with an increase in the accelerator opening θ. Then, the control process proceeds to Step S2.

At Step S2, controller 22 determines whether or not accelerator opening θ is larger than a predetermined threshold accelerator opening value θ0. When the answer to step S2 is affirmative (YES), the control process proceeds to step S3. On the other hand, when the answer to step S2 is negative (NO), the control process proceeds to step S11.

At Step S11, controller 22 controls throttle opening α to a predetermined large opening value. The predetermined large opening value is determined to provide a condition that intake pipe pressure Pa is slightly lower than the atmospheric pressure, and provides a minimum negative pressure required for evaporation and ventilation. Throttle opening α is constantly adjusted within a predetermined range of large opening based on monitoring of intake pipe pressure sensor 27. Then, at Step S12, controller 22 controls the engine torque in nearly steady state by continuously varying the operating angle and lift of intake valves 4 by intake valve event and lift control mechanism 2, and continuously varying the maximum lift phase of intake valves 4 by intake valve timing control mechanism 3. Specifically, this operation is so called a throttleless control operation in which throttle valve SV is held in a state of large opening close to full opening, and the intake air quantity is controlled by varying the opening of intake valves 4. During the throttleless control operation, exhaust turbocharger 1 is little used to pressurize the intake air, and a low fuel consumption operation with a little pumping loss is performed on the basis of a predetermined control map employed for normal engine operations.

At Step S3, controller 22 assumes that the engine is in an initial transient stage of acceleration, and controls throttle opening α to the maximum. Then, at Step S4, controller 22 outputs a control signal for intake valve event and lift control mechanism 2 to increase the operating angle of intake valves 4.

Figure 10:
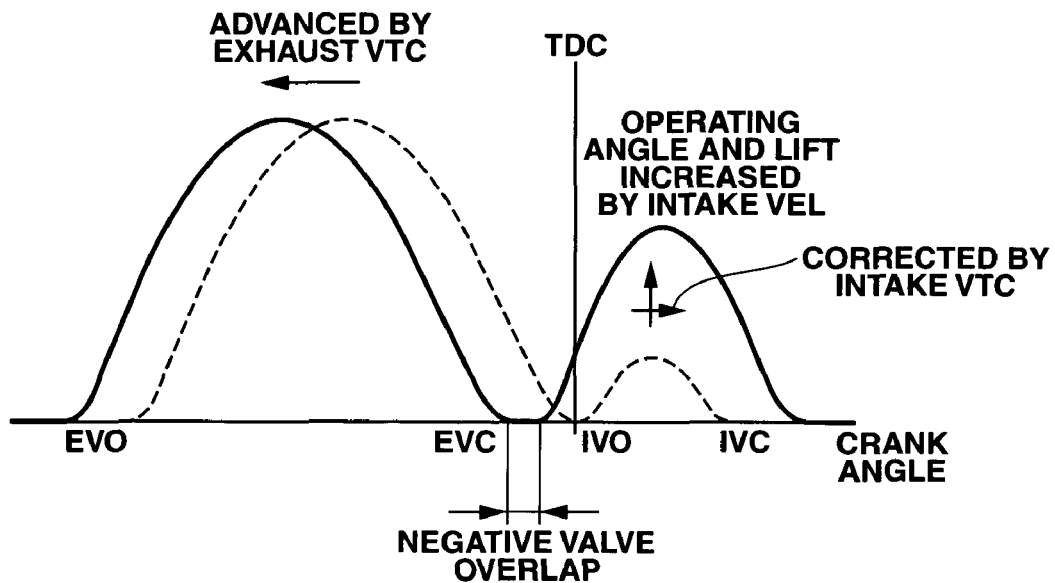
FIG. 10 is a graphic diagram showing how characteristics of operation of the intake valve and an exhaust valve of the engine are changed according to the control process of FIG. 9.

FIG. 10 shows how characteristics of operation of intake valves 4 and exhaust valves 5 are changed according to the operation of Step S4. In FIG. 10, broken lines indicate a condition before the operation of Step S4, and solid lines indicate a condition after the operation of Step S4. As shown in FIG. 10, the operating angle of intake valves 4 is increased, so as to advance the intake valve opening timing IVO, and retard the intake valve closing timing IVC. In this example, controller 22 further outputs a control signal for intake valve timing control mechanism 3 to correct or slightly retard the opening and closing timings of intake valves 4. This correction is effective for reducing the amount of advance of intake valve opening timing IVO, and thereby reducing the amount of increase of the valve overlap.

The pressure in intake pipe 04 on the downstream side of throttle valve SV, i.e. intake pipe pressure Pa, continues to be substantially equal to the atmospheric pressure after the accelerator opening starts to increase from a small value. Since fresh air is rapidly induced into combustion chamber 03 with no delay in pressure increase in intake pipe 04, the operation of increase of the operating angle of intake valves 4 results in a quick increase in the engine torque.

FIG. 12 shows how engine torque changes with respect to time in response to accelerator pedal depression in cases of the internal combustion engine system according to the present embodiment, and an internal combustion engine system according to a comparative example. In a region "A", the internal combustion engine system according to the comparative example shows a slower increase in the engine torque, as compared with the internal combustion engine system according to the present embodiment. This is because: when accelerator opening θ is small, then throttle opening α is set small so that the pressure in the intake pipe provides a higher negative pressure; when throttle opening α is maximized under this condition, there is a delay in movement of fresh air, resulting in a slow rise of the pressure in the intake pipe toward the atmospheric pressure.

On the other hand, the internal combustion engine according to the present embodiment shows a faster increase in the engine torque. This is because: even when accelerator opening θ is small, throttle opening α is set large so that the pressure in intake pipe 04 is substantially equal to the atmospheric pressure; when accelerator opening θ is increased, then the operating angle of intake valves 4 is increased so that a larger amount of fresh air enters the combustion chamber 03 with no delay in pressure increase in intake pipe 04. This significantly improves the initial response, i.e. the torque response in the initial stage of acceleration (region A).

Subsequent to Step S4, at Step S5, controller 22 outputs a control signal of advance to exhaust valve timing control mechanism 30 so as to advance the exhaust valve opening timing EVO and exhaust valve closing timing EVC, as shown in FIG. 10. This serves to increase the exhaust blowdown energy, increase the exhaust pressure, and thereby rapidly increase the rotation speed of exhaust turbine wheel 1a.

Since exhaust valve timing control mechanism 30 is constructed so that vane member 32 is biased to the advance side by coil springs 55, 56 as described above, it is possible to quickly complete the advance of exhaust valve opening timing EVO and exhaust valve closing timing EVC. This is effective for further increasing the rotation speed of exhaust turbine wheel 1a.

When the valve overlap period, in which both of intake valves 4 and exhaust valves 5 are open, is large, then the increased exhaust pressure is reversely flowing into combustion chamber 03 so as to reduce the quantity of fresh air entering the combustion chamber 03. According to the operation of Step S5, the exhaust valve closing timing EVC is advanced so as to reduce the increase of the valve overlap although the intake valve opening timing IVO is advanced at Step S4. Controller 22 may reduce the valve overlap by setting an amount of advance of exhaust valve closing timing EVC to be larger than an amount of advance of the intake valve opening timing IVO. This is effective for promoting the increase in the rotation speed of exhaust turbine wheel 1a (intake compressor wheel 1b), and increasing the transient engine torque with preventing the exhaust gas from replacing the fresh air in combustion chamber 03. As a result, the internal combustion engine system according to the present embodiment shows a faster increase in the engine torque in a region "B" in FIG. 12.

Since the intake valve opening timing IVO is corrected or retarded by intake valve timing control mechanism 3 at Step S4, this is effective for further reducing the increase in the valve overlap, and promoting the increase in the rotation speed of exhaust turbine wheel 1a.

Subsequent to Step S5, at Step S6, controller 22 measures actual operating positions of intake valve event and lift control mechanism 2, intake valve timing control mechanism 3, and exhaust valve timing control mechanism 30. Then, at Step S7, controller 22 determines whether or not the actual operating positions are identical to desired operating positions for the transient control process. When the answer to step S7 is NO, the control process returns to step S4 where controller 22 controls intake valve event and lift control mechanism 2, intake valve timing control mechanism 3, and exhaust valve timing control mechanism 30. On the other hand, when the answer to step S7 is YES, i.e. when the valve lift characteristics indicated by solid lines in FIG. 10 are attained, then the control of characteristics of operation of intake valves 4 and exhaust valves 5 is temporarily suspended.

Through Steps S11 and S12, when the accelerator opening is below a predetermined threshold value, controller 22 sets the throttle opening above a predetermined value; and controls the operating angle and the lift of intake valves 4 so as to attain the desired value of the engine output. Through Steps S3 to S7, when the accelerator opening is above the predetermined threshold value, controller 22 sets the throttle opening above the predetermined value; increases the operating angle and the lift of intake valves 4; and advances the opening timing of exhaust valves 5. In other words, through Steps S3 to S7, controller 22 performs a valve characteristic control process in response to an increase in the desired value of the engine output, the valve characteristic control process including: advancing the opening timing of the intake valve, and retarding the closing timing of the intake valve, by outputting the control signal to the intake valve characteristic varying section; and advancing the opening timing of the exhaust valve by outputting the control signal to the exhaust valve characteristic varying section.

In this example, the control of characteristics of operation of intake valves 4 and exhaust valves 5 may be performed simultaneously, or the control of characteristics of operation of intake valves 4 may be performed prior to that of exhaust valves 5. When the control of characteristics of operation of intake valves 4 is performed prior to that of exhaust valves 5, the increase in the transient engine torque based on increase in the operating angle of intake valves 4 is achieved with priority, and the torque response in the region A in FIG. 12 is improved with priority.

On the other hand, when the control of the characteristics of operation of exhaust valves 5 is performed prior to that of intake valves 4, then the valve overlap during the transient process is reduced so as to increase the rotation speed of exhaust turbine wheel 1a (intake compressor wheel 1b) with priority. This is effective for improving the response of increase in the engine torque in the region B in FIG. 12, although the improvement of the torque response in the region A is smaller.

Especially when the engine is operating in a predetermined low speed region, the control of the characteristics of operation of intake valves 4 is more effective for improving the torque response. Accordingly, the control of the characteristics of operation of intake valves 4 may prioritized higher in the predetermined low speed region. On the other hand, when the engine is operating in a predetermined middle and high speed region, the control of the characteristics of operation of exhaust valves 5 is more effective for increasing the rotation speed of exhaust turbine wheel 1a. Accordingly, the control of the characteristics of operation of exhaust valves 5 may prioritized higher in the predetermined middle and high speed region. The boost pressure of exhaust turbocharger 1 is thus quickly increased in the region B in FIG. 12.

Subsequent to Step S7, at Step S8, controller 22 measures, by boost pressure sensor 61, a boost pressure Pb in intake pipe 04 on the upstream side of throttle valve SV. Then, at Step S9, controller 22 determines whether or not boost pressure Pb has reached a predetermined threshold boost pressure value Pb0. When the answer to step S8 is NO, the control process returns to step S8. On the other hand, when the answer to step S8 is YES, the control process proceeds to step S10.

Figure 11:
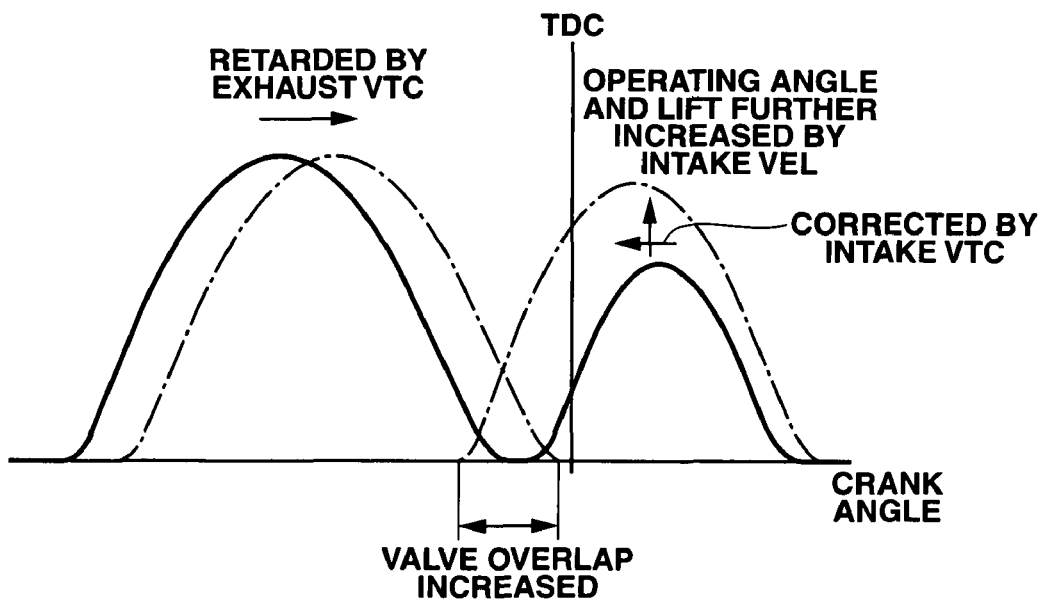
FIG. 11 is a graphic diagram showing how characteristics of operation of the intake valve and the exhaust valve are changed according to the control process of FIG. 9.

At Step S10, controller 22 sets the characteristics of operation of intake valves 4 and exhaust valves 5 as shown in FIG. 11. In FIG. 11, solid lines indicate a condition before the operation of Step S10, and short dotted long dotted lines indicate a condition after the operation of Step S10. As shown in FIG. 11, controller 22 controls exhaust valve timing control mechanism 30 to retard the exhaust valve opening timing EVO and exhaust valve closing timing EVC, and controls intake valve event and lift control mechanism 2 to further increase the lift of intake valves 4, and controls intake valve timing control mechanism 3 to slightly advance the maximum lift phase of intake valves 4. This is effective for increasing the valve overlap.

Through Step 10, controller 22 performs a second valve characteristic control process in response to an increase in the boost pressure of exhaust turbocharger 1, the second valve characteristic control process including: increasing the operating angle and the lift of intake valves 4 and advancing the intake valve opening timing IVO by the intake valve characteristic varying section; and retarding the opening timing and the closing timing of exhaust valves 5 by the exhaust valve characteristic varying section.

At the time of the operation of Step S10, the boost pressure Pb is high close to the exhaust pressure. Accordingly, even when the valve overlap is large, the amount of the exhaust gas reversely flowing into combustion chamber 03 is small. This large valve overlap is effective for reducing fluctuations of the exhaust pressure, promoting the remaining gas to flow to the exhaust pipe, and inducing the fresh air to enter combustion chamber 03. This increases the basic torque and power of the engine.

The slight correction or advance of the intake valve opening timing IVO and intake valve closing timing IVC by intake valve timing control mechanism 3 is effective for harmonizing the valve overlap period and the exhaust pressure fluctuation, i.e. conforming the valve overlap period to a period in which the exhaust pressure is relatively low, and thereby enhancing the scavenging effect. Controller 22 may set an amount of advance of the intake valve opening timing IVO to be larger than an amount of retard of the exhaust valve closing timing EVC. When the amount of advance of the intake valve opening timing IVO is set larger than the amount of retard of the exhaust valve closing timing EVC, the central phase of the valve overlap period is advanced. This is effective for synchronizing the negative pressure wave of fluctuations of the exhaust pressure with the valve overlap period, and thereby further enhancing the scavenging effect.

Since the operating angle and lift of intake valves 4 are increased by intake valve event and lift control mechanism 2 at Step S10, the intake air quantity under any given boost pressure is increased. This is effective for enhancing the combustion energy and increasing the output torque. Thus, the internal combustion engine system according to the present embodiment shows an increase in the basic or steady-state engine torque and power in a region "C" in FIG. 12.

Controller 22 may determine whether or not the boost pressure Pb is sufficiently high, on the basis of the rotation speed of exhaust turbine wheel 1a measured by turbine rotation sensor 60. Alternatively, controller 22 may determine that the boost pressure Pb is sufficiently high, when the difference between the exhaust pressure measured by exhaust pressure sensor 28 and the boost pressure Pb is lower than or equal to a predetermined threshold value.

FIG. 13 shows another control process to be performed by controller 22. This control process includes Steps S1 to S9 shown in FIG. 9, and an additional sub process for providing a fail-safe function. At Step S21, controller 22 reads accelerator opening θ, throttle opening α, and engine speed Ne, on the basis of the data signals outputted from the corresponding sensors. Then, at Step S22, controller 22 reads the intake pipe pressure Pa, the boost pressure Pb, and the exhaust pressure Pc. Then, at Step S23, controller 22 determines whether or not there is an abnormality in the internal combustion engine system, on the basis of comparison between a set of boost pressure Pb and exhaust pressure Pc and a set of engine speed Ne and throttle opening α. When the answer to step S23 is YES, then, controller 22 assumes that there is an abnormality in exhaust turbocharger 1, and proceeds to step S24. At Step S24, controller 22 controls intake bypass valve 08 and exhaust bypass valve 09 to open intake bypass passage 06 and exhaust bypass passage 07. As a result, exhaust turbocharger 1 is deactivated substantially. Then, at Step S25, controller 22 controls exhaust valve timing control mechanism 30 to fix the operating position of exhaust valves 5 at a predetermined retarded position suitable for a steady-state operating condition of low boost pressure. Then, at Step S26, controller 22 performs a fail-safe operation in which controller 22 controls the engine torque in accordance with accelerator opening θ by suitably controlling throttle valve SV, intake valve event and lift control mechanism 2, and intake valve timing control mechanism 3.

When the answer to step S23 is NO, the control process proceeds to steps S1 to S9, S11 and S12 described above. Subsequent to Step S9, at Step S13, controller 22 reads the exhaust pressure Pc. Then, at Step S14, controller 22 determines whether or not the difference Pc-Pb between exhaust pressure Pc and boost pressure Pb is lower than or equal to a predetermined threshold value. When the answer to step S14 is YES, then controller 22 assumes that there is no abnormality, and proceeds to Step S15. Step S15 is identical to Step S10 shown in FIG. 9. Specifically, at Step S15, controller 22 sets the characteristics of intake valves 4 and exhaust valves 5 as shown in FIG. 11. In FIG. 11, solid lines indicate a condition before the operation of Step S10, and short dotted long dotted lines indicate a condition after the operation of Step S10. As shown in FIG. 11, controller 22 controls exhaust valve timing control mechanism 30 to retard the exhaust valve opening timing EVO and exhaust valve closing timing EVC, and controls intake valve event and lift control mechanism 2 to further increase the valve lift of intake valves 4, and controls intake valve timing control mechanism 3 to slightly advance the valve lift central phase of intake valves 4. This is effective for increasing the valve overlap.

When the answer to Step S14 is No, then controller 22 detects or assumes that there is an abnormality such as abnormal wheel rotation in exhaust turbocharger 1, and proceeds to Step S24 where intake bypass valve 08 and exhaust bypass valve 09 are controlled to open.

The foregoing control process is effective for ensuring a minimum of the engine performance, even when exhaust turbocharger 1 is failed.

The present invention is not limited to the illustrated embodiment. Modifications are possible according to engine specifications. The variable valve actuating system according to the present embodiment may be applied not only to gasoline engines but also to diesel engines, and may be applied to internal combustion engines with a direct fuel injection system.

Coil springs 55, 56 provided in exhaust valve timing control mechanism 30 serve to quickly advance the opening and closing timings of exhaust valves 5, and quickly raise the rotation speed of exhaust turbocharger 1, when a rapid acceleration is requested. However, coil springs 55, 56 may be arranged in retard fluid pressure chamber 42 for mechanically biasing the vane member 32 to the retard side. In other words, coil springs 55, 56 may serve as a biasing device arranged to bias exhaust valve timing control mechanism 30 in a direction to retard the opening timing and the closing timing of exhaust valves 5. This is effective for stabilizing the fail-safe control operation, because the most retarded position of exhaust valve timing control mechanism 30 is suitable for situations where the engine is operating in a normal operating region in which the boost pressure Pb is low and the accelerator opening θ is low. Thus, even when exhaust turbocharger 1 is failed, the variable valve actuating system serves to ensure a minimum of the engine performance.

In summary, in response to a request of quick acceleration, the variable valve actuating system according to the embodiment increases the intake air quantity by increasing the operating angle of intake valves 4 (advancing the intake valve opening timing IVO and retarding the intake valve closing timing IVC), so as to increase the generated engine torque, and increase the quantity of exhaust gas. The increase in the generated engine torque serves to raise the torque response of the engine. The variable valve actuating system also increases the exhaust blowdown energy by advancing the exhaust valve opening timing EVO. The increase in the quantity of exhaust gas and the increase in the exhaust blowdown energy are effective for increasing the exhaust pressure, and thereby increasing the rotation speed of exhaust turbocharger 1. This results in a decrease in so called a turbo lag of exhaust turbocharger 1, and also serves to raise the torque response of the engine.

This application is based on a prior Japanese Patent Application No. 2007-58111 filed on Mar. 8, 2007. The entire contents of this Japanese Patent Application No. 2007-58111 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A variable valve actuating apparatus for an internal combustion engine with an exhaust turbocharger, the variable valve actuating apparatus comprising:
   an intake valve characteristic varying section arranged to receive a first control signal, and vary at least an opening timing and a closing timing of an intake valve of the internal combustion engine in accordance with the first control signal;
   an exhaust valve characteristic varying section arranged to receive a second control signal, and vary at least an opening timing of an exhaust valve of the internal combustion engine in accordance with the second control signal; and
   a control section configured to:
      identify a desired value of an output of the internal combustion engine; and
      perform a valve characteristic control process in response to an increase in the desired value of the output, the valve characteristic control process including:
         advancing the opening timing of the intake valve, and retarding the closing timing of the intake valve, by outputting the first control signal to the intake valve characteristic varying section; and
         advancing the opening timing of the exhaust valve by outputting the second control signal to the exhaust valve characteristic varying section.

2. The variable valve actuating apparatus as claimed in claim 1, wherein the intake valve characteristic varying section is arranged to vary at least an operating angle and a lift of the intake valve in accordance with the first control signal.

3. The variable valve actuating apparatus as claimed in claim 2, wherein the control section is configured to:
   identify an accelerator opening of the internal combustion engine;
   perform a first control process, when the accelerator opening is below a predetermined threshold value, the first control process including:
      setting an opening of a throttle valve of the internal combustion engine above a predetermined value; and
      controlling the operating angle and the lift of the intake valve by the intake valve characteristic varying section so as to attain the desired value of the output; and
   perform a second control process, when the accelerator opening is above the predetermined threshold value, the second control process including:
      setting the opening of the throttle valve above the predetermined value;
      increasing the operating angle and the lift of the intake valve by the intake valve characteristic varying section; and
      advancing the opening timing of the exhaust valve by the exhaust valve characteristic varying section.

4. The variable valve actuating apparatus as claimed in claim 2, wherein the intake valve characteristic varying section comprises:
   a first part arranged to continuously vary at least the operating angle and the lift of the intake valve;
   a second part arranged to continuously vary at least a maximum lift phase of the intake valve.

5. The variable valve actuating apparatus as claimed in claim 1, wherein the exhaust valve characteristic varying section is arranged to vary at least the opening timing and a closing timing of the exhaust valve in accordance with the second control signal.

6. The variable valve actuating apparatus as claimed in claim 5, wherein the valve characteristic control process includes advancing both of the opening timing and the closing timing of the exhaust valve by the exhaust valve characteristic varying section.

7. The variable valve actuating apparatus as claimed in claim 5, wherein the intake valve characteristic varying section is arranged to vary at least an operating angle and a lift of the intake valve in accordance with the first control signal, and wherein the control section is configured to perform a second valve characteristic control process in response to an increase in a boost pressure of the exhaust turbocharger, the second valve characteristic control process including:
   increasing the operating angle and the lift of the intake valve by the intake valve characteristic varying section; and
   retarding the opening timing and the closing timing of the exhaust valve by the exhaust valve characteristic varying section.

8. The variable valve actuating apparatus as claimed in claim 5, wherein the exhaust valve characteristic varying section is arranged to vary at least the opening timing and the closing timing of the exhaust valve, while holding constant an operating angle and a lift of the exhaust valve.

9. The variable valve actuating apparatus as claimed in claim 5, wherein the exhaust valve characteristic varying section includes a biasing device arranged to bias the exhaust valve characteristic varying section in a direction to advance the opening timing and the closing timing of the exhaust valve.

10. The variable valve actuating apparatus as claimed in claim 5, wherein the exhaust valve characteristic varying section includes a biasing device arranged to bias the exhaust valve characteristic varying section in a direction to retard the opening timing and the closing timing of the exhaust valve.

11. The variable valve actuating apparatus as claimed in claim 5, wherein the control section is configured to reduce a valve overlap between the intake valve and the exhaust valve by setting an amount of advance of the closing timing of the exhaust valve to be larger than an amount of advance of the opening timing of the intake valve during the valve characteristic control process.

12. The variable valve actuating apparatus as claimed in claim 5, wherein the control section is configured to perform a second valve characteristic control process, when detecting that a boost pressure of the exhaust turbocharger is above a predetermined threshold value, the second valve characteristic control process including:
   increasing an operating angle of the intake valve and advancing the opening timing of the intake valve by the intake valve characteristic varying section; and retarding the opening timing and the closing timing of the exhaust valve by the exhaust valve characteristic varying section.

13. The variable valve actuating apparatus as claimed in claim 12, wherein the control section is configured to set an amount of advance of the opening timing of the intake valve to be larger than an amount of retard of the closing timing of the exhaust valve during the second valve characteristic control process.

14. The variable valve actuating apparatus as claimed in claim 5, wherein the control section is configured to retard the opening timing and the closing timing of the exhaust valve by the exhaust valve characteristic varying section, when detecting an abnormality in the exhaust turbocharger.

15. The variable valve actuating apparatus as claimed in claim 1, wherein the control section is configured to operate the intake valve characteristic varying section prior to the exhaust valve characteristic varying section during the valve characteristic control process.

16. The variable valve actuating apparatus as claimed in claim 1, wherein the control section is configured to operate the exhaust valve characteristic varying section prior to the intake valve characteristic varying section during the valve characteristic control process.

17. The variable valve actuating apparatus as claimed in claim 1, wherein the control section is configured to increase the desired value of the output in response to an increase in an accelerator opening of the internal combustion engine.

18. The variable valve actuating apparatus as claimed in claim 1, wherein the control section is configured to:
operate the intake valve characteristic varying section prior to the exhaust valve characteristic varying section, when a rotation speed of the internal combustion engine is below a predetermined threshold value;
operate the exhaust valve characteristic varying section prior to the intake valve characteristic varying section, when the rotation speed of the internal combustion engine is above the predetermined threshold value.

19. A variable valve actuating apparatus for an internal combustion engine with an exhaust turbocharger, the variable valve actuating apparatus comprising:
an intake valve characteristic varying section arranged to vary at least an operating angle and a lift of an intake valve of the internal combustion engine;
an exhaust valve characteristic varying section arranged to vary at least an opening timing and a closing timing of an exhaust valve of the internal combustion engine; and
a control section for controlling the intake valve characteristic varying section and the exhaust valve characteristic varying section in accordance with a desired value of an output of the internal combustion engine, the control section being configured to:
perform a first valve characteristic control process in response to an increase in the desired value of the output, the first valve characteristic control process including:
advancing an opening timing of the intake valve, and retarding a closing timing of the intake valve by the intake valve characteristic varying section; and
advancing the opening timing of the exhaust valve by the exhaust valve characteristic varying section; and
perform a second valve characteristic control process in response to an increase in a boost pressure of the exhaust turbocharger, the second valve characteristic control process including:
increasing the operating angle and the lift of the intake valve by the intake valve characteristic varying section; and
retarding the opening timing and the closing timing of the exhaust valve by the exhaust valve characteristic varying section.

20. The variable valve actuating apparatus as claimed in claim 19, wherein the control section is configured to advance the opening timing and the closing timing of the exhaust valve by the exhaust valve characteristic varying section so as to reduce a valve overlap between the intake valve and the exhaust valve during the first valve characteristic control process.

21. A process of controlling a variable valve actuating apparatus with an exhaust turbocharger, the variable valve actuating apparatus including an intake valve characteristic varying section arranged to vary at least an opening timing and a closing timing of an intake valve of an internal combustion engine, and an exhaust valve characteristic varying section arranged to vary at least an opening timing of an exhaust valve of the internal combustion engine, the process comprising:
advancing the opening timing of the intake valve, and retarding the closing timing of the intake valve, and advancing the opening timing of the exhaust valve, in response to an increase in a desired value of an output of the internal combustion engine.

* * * * *